(12) United States Patent
Wu et al.

(10) Patent No.: US 10,295,697 B2
(45) Date of Patent: May 21, 2019

(54) DETERMINATION OF TRUE FORMATION RESISTIVITY

(71) Applicant: Halliburton Energy Services, Inc., Houston, TX (US)

(72) Inventors: Hsu-Hsiang Wu, Sugar Land, TX (US); Michael S. Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/650,748

(22) PCT Filed: Jan. 30, 2013

(86) PCT No.: PCT/US2013/023826
§ 371 (c)(1),
(2) Date: Jun. 9, 2015

(87) PCT Pub. No.: WO2014/120150
PCT Pub. Date: Aug. 7, 2014

(65) Prior Publication Data
US 2015/0369952 A1    Dec. 24, 2015

(51) Int. Cl.
*G01V 3/30* (2006.01)
*G01V 3/40* (2006.01)
(Continued)

(52) U.S. Cl.
CPC .................. *G01V 3/38* (2013.01); *G01V 3/30* (2013.01); *G01V 3/34* (2013.01); *G01V 3/36* (2013.01);
(Continued)

(58) Field of Classification Search
CPC ... G01V 3/30; G01V 3/34; G01V 3/36; G01V 3/38; G01V 3/40; G01V 8/12; G01V 8/20
(Continued)

(56) References Cited

U.S. PATENT DOCUMENTS

| 5,241,273 A | 8/1993 | Luling |
| RE35,386 E | 12/1996 | Wu et al. |

(Continued)

FOREIGN PATENT DOCUMENTS

| CN | 101460698 A | 6/2009 |
| WO | 2008076130 A1 | 6/2008 |
| WO | 2012030327 A1 | 3/2012 |

OTHER PUBLICATIONS

"Australian Application Serial No. 2013377121, Office Action dated May 27, 2015", 2 pgs.
(Continued)

*Primary Examiner* — Sujoy K Kundu
*Assistant Examiner* — Lynda Dinh
(74) *Attorney, Agent, or Firm* — Gilliam IP PLLC

(57) ABSTRACT

Various embodiments include apparatus and methods to determine true formation resistivity. Such apparatus and methods may use techniques to effectively reduce or eliminate polarization horn effects at boundaries between formations of different resistivity. The techniques may use combinations of geosignals and adjustments of measurement data to evaluate true formation resistivity for formation layers investigated. Such techniques and associated analysis may be conducted real time. Additional apparatus, systems, and methods are disclosed.

75 Claims, 18 Drawing Sheets

(51) Int. Cl.
  *G01V 3/38* (2006.01)
  *G01V 3/36* (2006.01)
  *G01V 3/34* (2006.01)
  *G01V 8/12* (2006.01)
  *G01V 8/20* (2006.01)

(52) U.S. Cl.
  CPC ............... *G01V 3/40* (2013.01); *G01V 8/12* (2013.01); *G01V 8/20* (2013.01)

(58) Field of Classification Search
  USPC .............................................. 702/6, 7, 9, 12
  See application file for complete search history.

(56) References Cited

U.S. PATENT DOCUMENTS

| | | | |
|---|---|---|---|
| 5,757,191 | A | 5/1998 | Gianzero |
| 5,886,526 | A | 3/1999 | Wu |
| 5,892,361 | A | 4/1999 | Meyer, Jr. et al. |
| 7,019,528 | B2 | 3/2006 | Bittar |
| 2007/0103161 | A1 | 5/2007 | San Martin et al. |
| 2008/0078580 | A1 | 4/2008 | Bittar |
| 2009/0230968 | A1* | 9/2009 | Bittar .................. E21B 47/024 324/338 |
| 2010/0123462 | A1* | 5/2010 | Bittar .................. G01V 3/28 324/369 |
| 2010/0127708 | A1 | 5/2010 | Bittar |
| 2011/0133740 | A1 | 6/2011 | Seydoux et al. |
| 2012/0215451 | A1 | 8/2012 | Husser et al. |
| 2012/0283951 | A1 | 11/2012 | Li et al. |
| 2012/0306500 | A1 | 12/2012 | Bittar et al. |

OTHER PUBLICATIONS

"International Application Serial No. PCT/US2013/023826, International Preliminary Report on Patentability dated Apr. 20, 2015", 31 pgs.
"International Application Serial No. PCT/US2013/023826, International Search Report dated Sep. 13, 2013", 7 pgs.
"International Application Serial No. PCT/US2013/023826, Response filed Oct. 1, 2014 to Written Opinion dated Sep. 13, 2013", 24 pgs.
"International Application Serial No. PCT/US2013/023826, Written Opinion dated Sep. 13, 2013", 8 pgs.
"Canadian Application Serial No. 2,895,671, Office Action dated Jun. 29, 2016", 4 pgs.
"Chinese Application Serial No. 201380066956.5, Office Action dated Jul. 26, 2017", 5 pages.
"Canadian Application Serial No. 2,895,671, Second Office Action dated Jun. 28, 2017".
"Mexican Patent Application No. MX/a/2015/008025; Office Action dated Feb. 12, 2017.", 4 pages.
"Russian Application Serial No. 2015123728; Office Action dated Jan. 20, 2017.", 4 pages.
"Russian SearchReport dated Jan. 20, 2017.", 2 pages.
Chinese Application Serial No. 201380066956.5; Chinese Office Action; dated Feb. 6, 2018, 13 Pages.
Mexico application serial No. a/2015/008025, translated office action, dated Sep. 22, 2017, 6 pages.
Canadian Application Serial No. 2,895,671; Third Examiner's Letter; Jun. 26, 2018, 6 pages.
Russian Application Serial No. 2015123728; Notice of Decision to Grant; dated Jun. 4, 2018, 25 pages.
GCC Application Serial No. 2014-26320; GCC Examination Report, dated May 14, 2018, 3 pages.
"Chinese Application Serial No. 201380066956.5, Office Action dated Nov. 28, 2016".
Chinese Application Serial No. 201380066956.5; Fourth Exam Report; dated Aug. 21, 2018, 7 pages.
Indian Application Serial No. 4965/DELNP/2015; Examination Report; dated Aug. 23, 2018, 8 pages.
ID Application Serial No. P00201503712; Office Action: dated Jan. 14, 2019, 3 pages.
CN Application Serial No. 201380066956.5; Office Action; dated Jan. 22, 2019, 8 pages.

* cited by examiner

DETERMINATION OF TRUE FORMATION RESISTIVITY

PRIORITY APPLICATIONS

This application is a U.S. National Stage Filing under 35 U.S.C. 371 from International Application No. PCT/US2013/023826, filed on 30 Jan. 2013, and published as WO 2014/120150 A1 on 7 Aug. 2014; which application and publication are incorporated herein by reference in their entirety.

TECHNICAL FIELD

The present invention relates generally to apparatus and methods related to oil and gas exploration.

BACKGROUND

In drilling wells for oil and gas exploration, understanding the structure and properties of the associated geological formation provides information to aid such exploration. True formation resistivity is a key petrophysical parameter that helps petrophysicists to characterize and develop a reservoir. A resistivity measurement presents an electrical property of formations surrounding the logging tools, where different formations have distinct and unique resistivity readings. For example, a salt water formation presents a low resistivity reading and an oil reservoir presents a high resistivity reading. A continuous resistivity log allows petrophysicists to recognize formation geology and to develop a good wellbore placement program for maximum oil production in the reservoir. However, a resistivity measurement is often problematic in layered formations, especially while the logging tool is near the boundary between the layers, each with different resistivity value. Such boundary effects, known as polarization horn effects, can produce significant responses to conventional propagation electromagnetic (EM) wave tools and unrealistic resistivity reading with very high value may be measured. Consequently, misinterpretation of formation geology may occur based on such resistivity measurements.

In general, one-dimensional (1D) inversion is often used to eliminate such horn effects and explore the true formation resistivity profiles. Inversion operations can include a comparison of measurements to predictions of a model such that a value or spatial variation of a physical property can be determined. In inversion, measured data may be applied to construct a model that is consistent with the data. For example, an inversion operation can include determining a variation of electrical conductivity in a formation from measurements of induced electric and magnetic fields. Other techniques, such as a forward model, deal with calculating expected observed values with respect to an assumed model. In zero-dimensional (0D) inversion, there is no variation in the formation, such as in a homogenous formation. In 1D modeling, there is variation in one direction such as a formation of parallel layers. In two dimensional (2D) modeling, there is variation in two directions. In three dimensional (3D) modeling, there is variation in three directions. However, inversion schemes can be complicated and can have several uncertainties, such as initial formation model, number of input signals for the inversion, etc., that may cause different inverted results. The usefulness of such traditional measurements and inversion analysis may be related to the precision or quality of the information derived from measurements and processes to evaluate the information.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
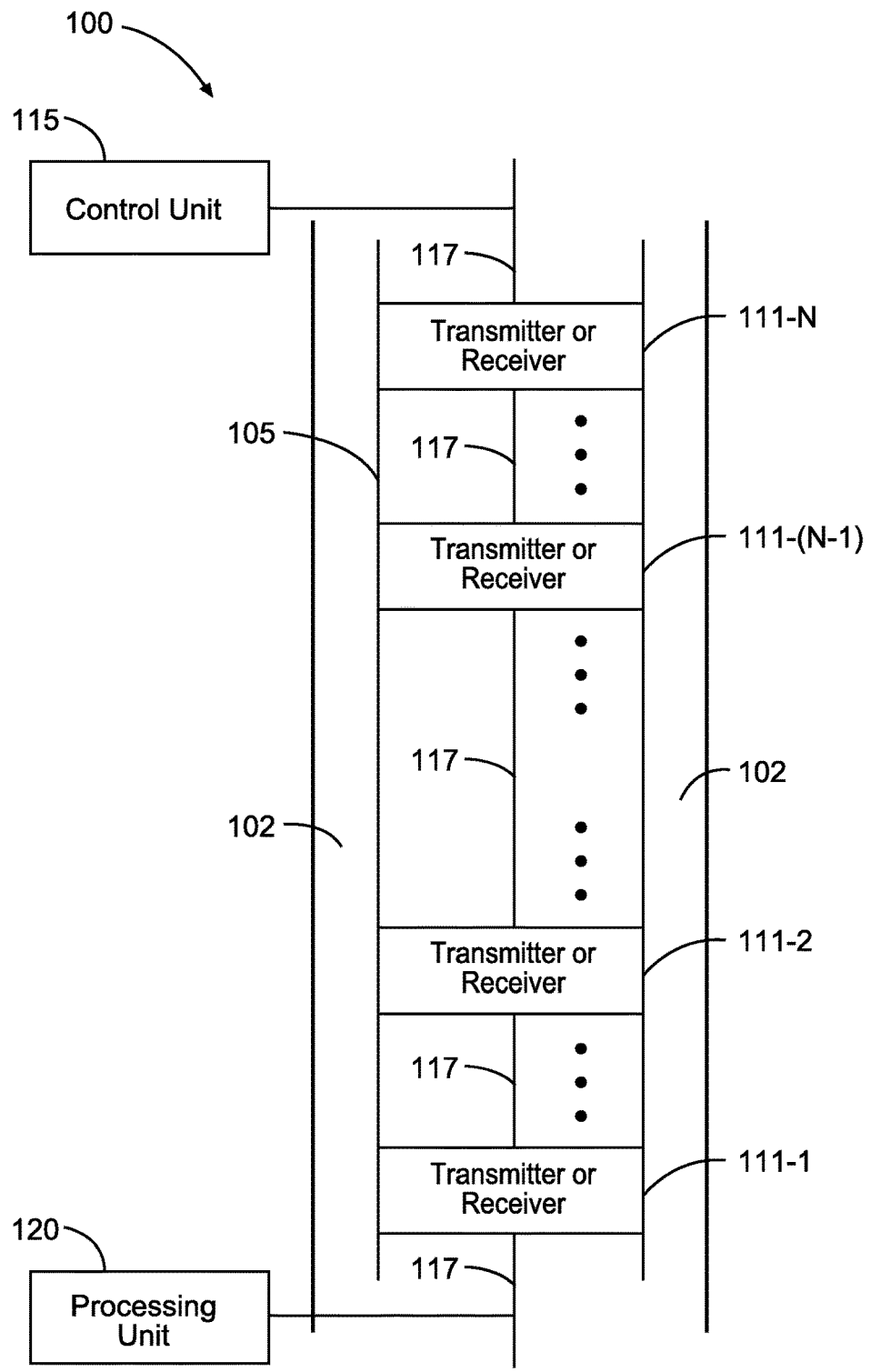
FIG. 1 shows a block diagram of an example system to determine formation resistivity, according to various embodiments.

FIG. 1 shows a block diagram of an embodiment of a system 100 operable to determine formation resistivity. The system 100 includes a measurement tool 105 operable in a well. The measurement tool 105 has an arrangement of sensors 111-1, 111-2 . . . 111-(N−1), 111-N along a longitudinal axis 117 of measurement tool 105. Each sensor 111-1, 111-2 . . . 111-(N−1), 111-N can be utilized as a transmitting sensor or a receiving sensor under the control of a control unit 115. The transmitting sensors and receiving sensors can be realized as transmitter antennas and receiver antennas. The sensors 111-1, 111-2 . . . 111-(N−1), 111-N may be arranged as a plurality of groups, where each group includes a transmitter sensor and a receiver sensor spaced apart by a separation distance. Sensors disposed in the various groups can be structured in a number of ways that may depend on the application of the measurement tool 105 in a measurement process. Each group can include tilted antennas and non-tilted antennas. Each group can include a grouping of a number of transmitter sensors and a number of receiver sensors. For example, each group can include, but is not limited to, a grouping of two transmitters and two receivers. The two transmitters and the two receivers in a grouping can be arranged with a symmetrical orientation. Sensors that are tilted can be arranged with respect to a longitudinal axis 117. Groups having different separation distances between transmitting sensors and receivers can be used to investigate formations over different distances from the measurement tool 105. The larger separation distance corresponds to investigating formations over larger distances from the tool.

The control unit 115 is operable to manage generation of a probe signal from the transmitter sensor from each group and collection of received signals in the respective group, where the received signals can be acquired relative to a rotation of the measurement tool 105. The rotation of the measurement tool 105 can be partitioned into N segments, called bins, in which completion of the N bins is one complete rotation of the tool, N≥2, where N is the total number of bins. Each bin has an associated azimuthal angle cp. In various applications, N can be equal to 32. However, N can be set to other values. The received signals can correspond to the bins associated with the measurement tool 105. The control unit 115 is operable to select one or more transmitter sensors from among the sensors in the arrangement of the sensors 111-1, 111-2 . . . 111-(N−1), 111-N and to select one or more receiver sensors from among the sensors in the arrangement of the sensors 111-1, 111-2 . . . 111-(N−1), 111-N. System 100 can include a processing unit 120 to process the received signals to determine the formation resistivity, which can include evaluating the validity of the measured formation resistivity.

The processing unit 120 can be structured to control and process measurement values from operating the measurement tool 105. The processing unit 120 can be structured to acquire measurement values from operating the measurement tool 105 in a borehole corresponding to drilling at a dip angle greater than zero. The measurement tool 105 once structured with transmitter antennas and receiver antennas and deployed may have a fixed arrangement of transmitter and receiver antennas. The fixed arrangement can include transmitter antennas and receiver antennas at fixed distances from each other with tilt angles with respect to the longitudinal axis of the measurement tool 105. Non-tilted antennas have a tilt angle of 0°. Tilted antennas may have a tilt angle of ranging from above 0° to near 90°. The processing unit 120 can treat the arrangement of transmitter and receiver angles as having antennas whose tilt angle can operably be adjusted. With the deployed the measurement tool 105 having fixed tilt angles, treating the arrangement of transmitter and receiver angles as having antennas whose tilt angle can operably be adjusted effectively defines a virtual arrangement of the same transmitter and receiver antennas.

Instructions stored of the processing unit 120 can be executed to generate new measurement values for the virtual arrangement of the same transmitter and receiver antennas by processing the measurement values from operating the measurement tool, where the processing uses a relationship including a tilt angle of a receiver antenna in the fixed arrangement that is different from a tilt angle of the same receiver antenna in the virtual arrangement. The new measurements can be used in the processing unit 120 to determine an estimate of a true formation resistivity of the formation being investigated. In an embodiment, from acquiring values from making measurements during a rotation of the measurement tool relative to N bins, the processing unit 120 can generate new measurement values, which can include generating $V_{R_{ind}}^{T_{ind}}{'}(i)$ according to $$V_{R_{ind}}^{T_{ind}}{'}(i) = V_{R_{ind}}^{T_{ind}}(i) \times \frac{\sin\theta_{r2}}{\sin\theta_{r1}} + \frac{2}{N}\sum_{i=1}^{N} V_{R_{ind}}^{T_{ind}}(i) \times \frac{\sin(\theta_{r1} - \theta_{r2})}{\sin(2\theta_{r1})}, \quad (1)$$

$$i = 1, 2, \ldots, N$$

for the fixed arrangement having two receiver antennas and two transmitter antennas, where $T_{ind}$ indicates different available transmitter(s) and $R_{ind}$ indicates different available receiver(s) and $V_{R_{ind}}^{T_{ind}}(i)$ is the signal measured at receiver $R_{ind}$, in response to a signal being transmitted from transmitter $T_{ind}$, in bin i, i=1 . . . N, and $V_{R_{ind}}^{T_{ind}}{'}(i)$ is the new measurement value for the receiver antenna $R_{ind}$ at tilt angle $\theta_{r2}$ in the virtual arrangement with the receiver antenna $R_{ind}$ at tilt angle $\theta_{r1}$ in the fixed arrangement at which the measurement values from operating the measurement tool are acquired.

The processing unit 120 can be used with a number of antenna arrangements to generate new measurement values via a transformation procedure. For example, in the fixed arrangement and in the virtual arrangement, two transmitters are non-tilted. Alternatively, the two transmitters can be tilted in the fixed arrangement such that two transmitters are perpendicular to two receivers. For transmitters having tilted antennas, generating new measurement values can include determining coupling components to calculate $V_{R_{ind}}^{T_{ind}}(i)$ from which $V_{R_{ind}}^{T_{ind}}{'}(i)$ is generated. The fixed arrangement can include two transmitters or two receivers arranged such that separation between each transmitter and each receiver is at a fixed distance.

The transformation procedure performed by the processing unit 120 can be implemented to avoid the polarization horn effects. As noted, polarization horn effects occur when a measurement tool is near a boundary between formation layers of different resistivity. Determination that the measurement tool 105 is near a boundary may be used to initiate the transformation procedure. Proximity to a boundary between formation layers can be provided by use of geosignals.

Geosignals are indicative of the direction of drilling tools downhole as well as being capable of detecting boundaries. Capabilities of geosignals are useful in geosteering to optimize well placement for maximum oil recovery. Apparatus and processing schemes, as discussed herein, allow for the generation of a geosignal. A geosignal may be based one or more properties of earth formations as a function of distance from a reference point. The geosignals defined herein have a variety of applications. Geosignals also provide azimuthal orientation information of rotary tools. In addition, the geosignal can be used for the calculation of distance to bed boundaries.

Geosignals can be defined in a number of ways. For example, two kinds of geosignal definitions, $V_{Geo1}$ and $V_{Geo2}$, have been used with respect to a signal acquired at a receiver in response to a signal transmitted from a transmitter. Geosignal $V_{Geo1}$ can be defined by $$V_{Geo1}(i) \equiv \frac{V_R^T(\phi_i)}{\frac{1}{N}\sum_{i=1}^{N} V_R^T(\phi_i)}, i = 1, \ldots, N \quad (2)$$

and geosignal $V_{Geo2}$ can be expressed as $$V_{Geo2}(i) \equiv \frac{V_R^T(\phi_i)}{V_R^T(\phi_j)}, i = 1, \ldots, N. \quad (3)$$

Figure 11:
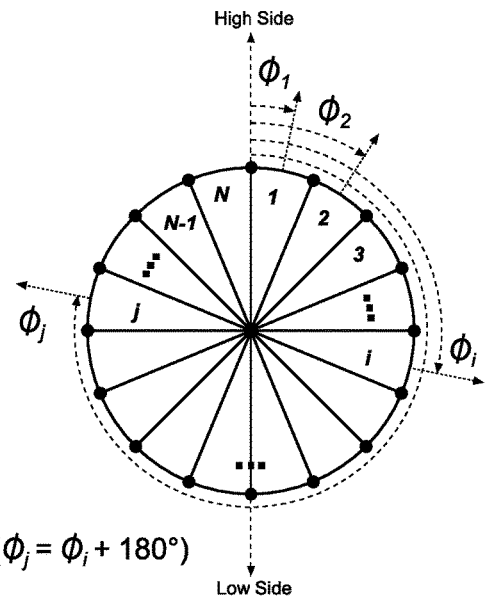
FIG. 11 shows a configuration of a measurement tool's azimuthal angle at each bin direction, according to various embodiments.

In these geosignals, i is the index of bin number of a rotating tool, $\phi_i$ is the corresponding azimuthal angle from high side to the bin with index i as shown in FIG. 11, $\phi_j$ is the azimuthal angle of bin j opposite to the azimuthal direction of bin i, that is, 180 degrees from bin i, and N is the total number of bins in FIG. 11. The geosignal can be used as corresponding geosignal phase and geosignal attenuation. For example, $V_{Geo2}$ can provide $$\text{Phase}_{Geo}(\phi_i) = \text{phase}\{V_R^T(\phi_i)\} - \text{phase}\{V_R^T(\phi_i+\pi)\} \text{ and} \quad (4)$$

$$A_{Geo}(\phi_i) = \log|V_R^T(\phi_i)| - \log|V_R^T(\phi_i+\pi)|. \quad (5)$$

At the distances where the measured resistivity is essentially the true resistivity, the measurement tool 105 is in a homogenous region and the phase of the geosignals is zero.

The processing unit 120 transforming measurement values from an antenna arrangement having a deployed set of tilt antennas to measurement values corresponding to the antennas at a different set of tilt angles allows an estimate of true formation resistivity to be determined without using an inversion procedure. Alternatively, this estimate using the transformation procedure can be used as a starting point for an in-depth inversion process such that an inverted geology formation may be optimized. In either case, use of this transformation process can provide for enhanced accuracy of resistivity measurements and for avoidance of polarization horn effects. In addition, the overall procedure to provide a true formation resistivity can be conducted as a real time determination of true formation resistivity. The processing unit 120 can be structured to perform in a manner similar to or identical to processes and procedures discussed herein.

In various embodiments, the measurement tool 105 can be implemented in measurements-while-drilling (MWD) applications such as a logging-while-drilling (LWD) tool. The control unit 115 and the processing unit 120 can be integrated in housings operable in a well along with the plurality of antennas. Tool electronics can be placed inside a collar in a drill string on which the tool is mounted. The measurement tool 105 can be implemented in a wireline application having instrumentality to rotate the measurement tool 105.

In various embodiments, a technology having processes to eliminate horn effects on resistivity measurements can be used on LWD propagation wave resistivity measurements. Methods discussed herein include procedures to attain true formation resistivity readings in real time applications via azimuthal LWD tools. The techniques herein are also suitable for appropriately structured sensors that provide deep azimuthal resistivity measurements including tools with tilted transmitters that can perform deep azimuthal resistivity measurements. These procedures can be applied to other measurement tools such as wireline tools.

Figure 2:
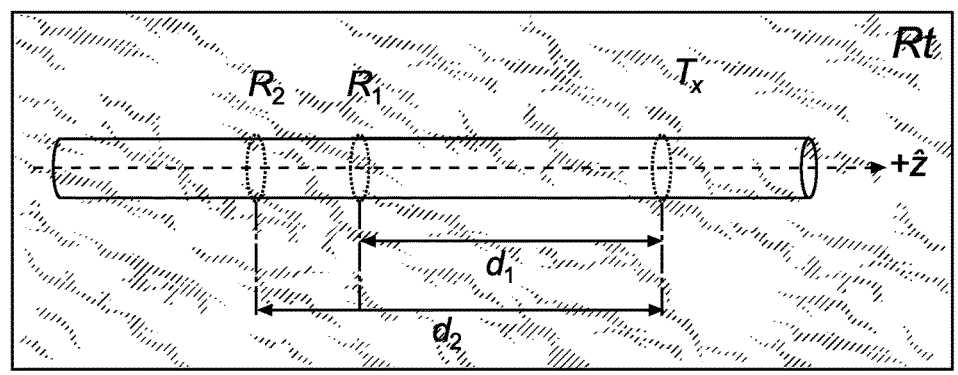
FIG. 2 illustrates an electromagnetic tool located in a homogeneous formation medium, according to various embodiments.
Figure 3A:
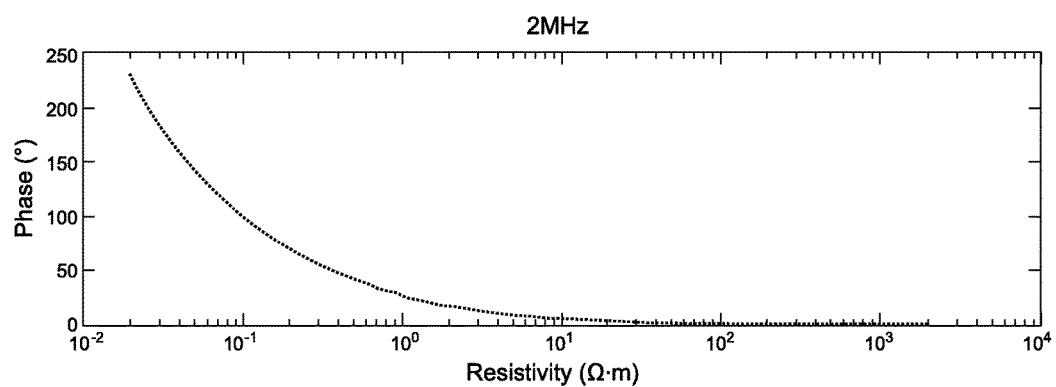
FIG. 3A shows an example of phase attenuation conversion charts, according to various embodiments.
Figure 3B:
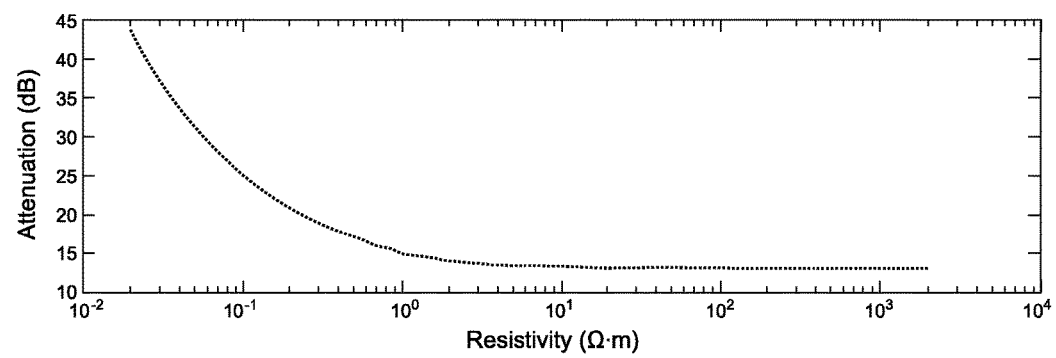
FIG. 3B shows an example of attenuation conversion charts, according to various embodiments.

FIG. 2 illustrates an electromagnetic tool located in a homogeneous formation medium. Propagation EM wave resistivity tools often use resistivity conversion tables to interpret formation resistivity. A conventional resistivity conversion table is created on the basis of complex voltage signals received at two receivers associated with a firing of a transmitter. With the firing of the transmitter $T_x$ in FIG. 2, two receivers $R_1$ and $R_2$ measure two complex voltage signals, $V_{R1}$ and $V_{R2}$, respectively, that varies while the formation resistivity value (Rt) changes. Using the phase part and the attenuation part of the ratio of $V_{R2}$ to $V_{R1}$ with respect to distinct values of Rt, corresponding phase and attenuation conversion tables can be obtained. FIGS. 3A-3B display an example of phase and attenuation conversion tables when operating a tool with non-tilted transmitter and non-tilted receivers in FIG. 2 at frequency of 2 MHz, where spacing $d_1$ is 12 inch and spacing $d_2$ is 20 inch. Consequently, raw measurements of such propagation wave tools can be transformed into phase and attenuation resistivity reading based on the charts in FIGS. 3A-3B.

Figure 4:
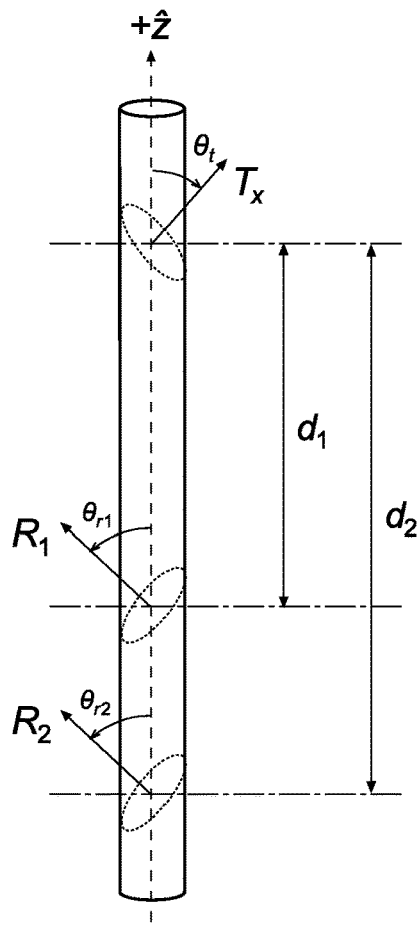
FIG. 4 illustrates an electromagnetic tool equipped with a tilted antenna design, according to various embodiments.

With the introduction of tilted antenna designs, phase and attenuation resistivity conversion tables are also available for the tool design in FIG. 4. Such tilted antenna designs can produce azimuthal sensitive resistivity measurements as well as azimuthal geosignal responses. The azimuthal measurements are capable of determining tool's drilling direction as well as indicating tool's azimuthal orientation. Related applications, such as geosteering, distance to bed boundary, formation anisotropy detection, etc., can all be based on such azimuthal sensitivity measurements such as with the tool design in FIG. 4.

Figure 5:
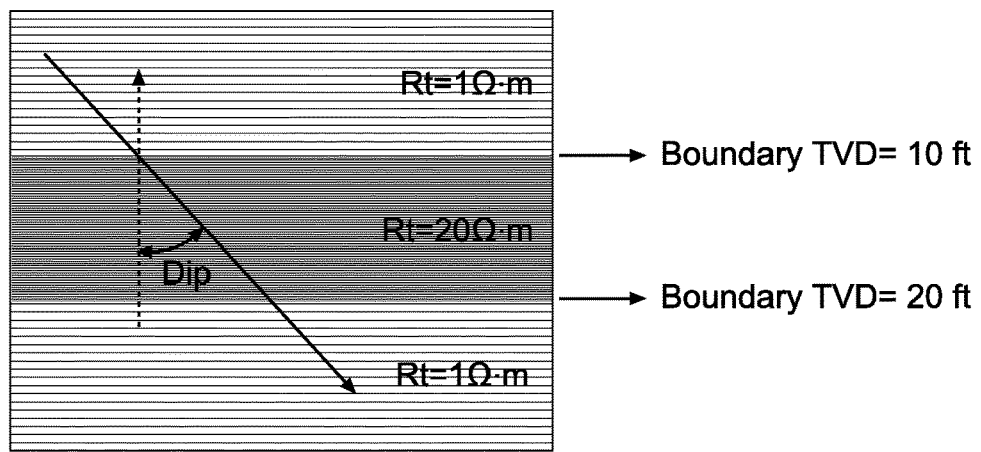
FIG. 5 depicts a three-layer isotropic formation model, according to various embodiments.

Resistivity measurements present resistivity measurements surrounding the logging tool, but the measurements become problematic when the tool is near the boundary between layers with different resistivity values. An unreasonable resistivity reading may occur during horizontal drilling activity with high relative dip angle and high resistivity contrast between the layers. Consider a three-layer isotropic formation model as an example, shown in FIG. 5. Both the topmost layer and the lowest layer have true formation resistivity of 1 Ω·m, and the middle layer has a high resistivity of 20 Ω·m. The upper boundary between the topmost layer and the middle layer is at true vertical depth (TVD) of 10 ft and the lower boundary is at TVD of 20 ft, indicating that only 10 ft thickness for the middle layer. In the model, the layers are shown as parallel to the horizon with the magnitude of the inclination of a plane corresponding to drilling direction from horizontal given as the dip. However, formation layers or beds may not be parallel to the horizontal such as the surface. A relative dip angle can be defined as the angle between a line normal to the plane of a bed and the direction of the drilling path or borehole.

Figure 6:
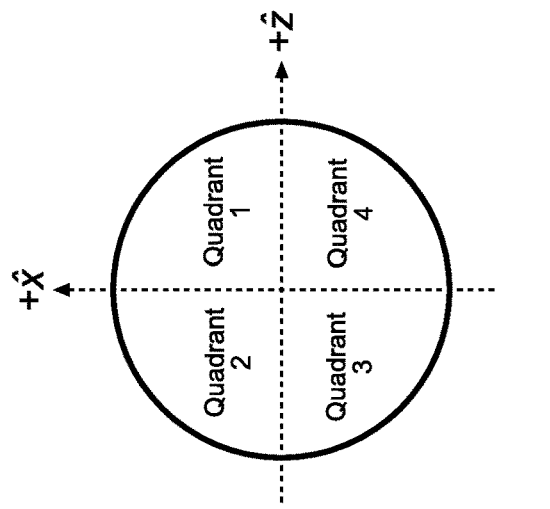
FIG. 6 shows a configuration of an electromagnetic measurement tool equipped with symmetrical antenna structures, according to various embodiments.
Figure 6:
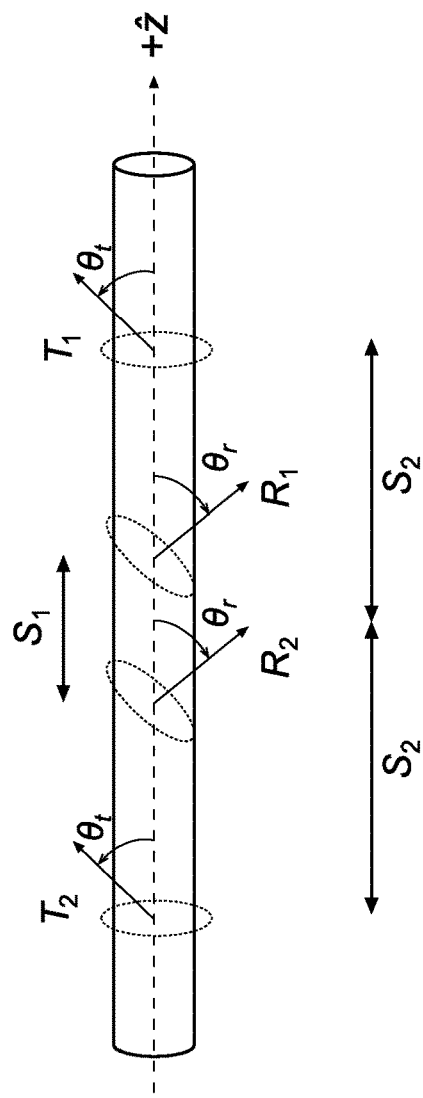

Compensated signals were simulated for an EM tool with symmetrical structures as shown in FIG. 6. The symmetric EM tool has two transmitters both tilted at $\theta_t$ and two receivers both tilted at $\theta_r$. The tilt angle $\theta_t$ and $\theta_r$ are defined based on the quadrants in FIG. 6, where the z direction is tool's drilling direction and the x direction is often determined by magnetometer or gravity devices. With an operating frequency of 2 MHz, spacing ($S_1$) of 8 inches between receivers, and spacing ($S_2$) of 16 inches from a transmitter to the center of the two receivers, FIGS. 7A-7B demonstrate the average phase and attenuation resistivity responses when two commercial LWD tools are operated in the formation model in FIG. 5 with the relative dip angle of 85°. One of the two tools was equipped with all non-tilted antenna loops and the other tool was installed with tilted central receivers ($\theta_r$=45°) and non-tilted transmitters.

Figure 7A:
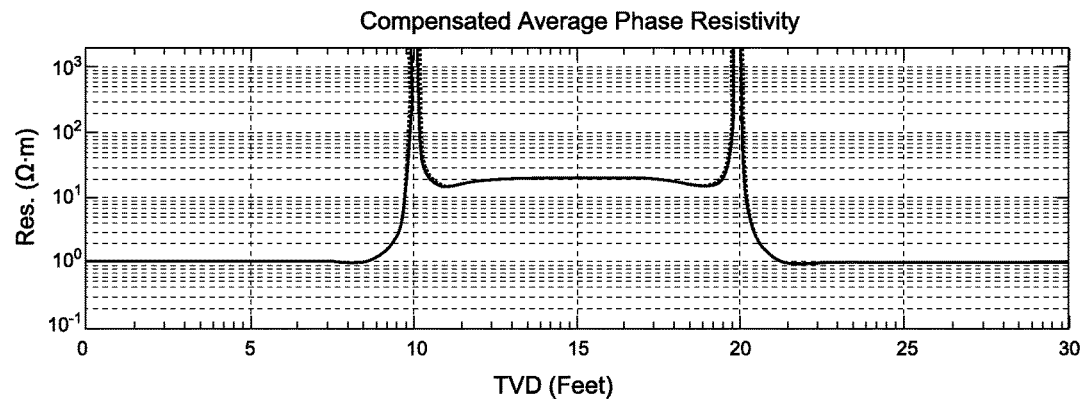
FIG. 7A shows compensated average phase resistivity measurements of two measurement tools in the formation model of FIG. 5 with relative dip angle of 85°, according to various embodiments.
Figure 7B:
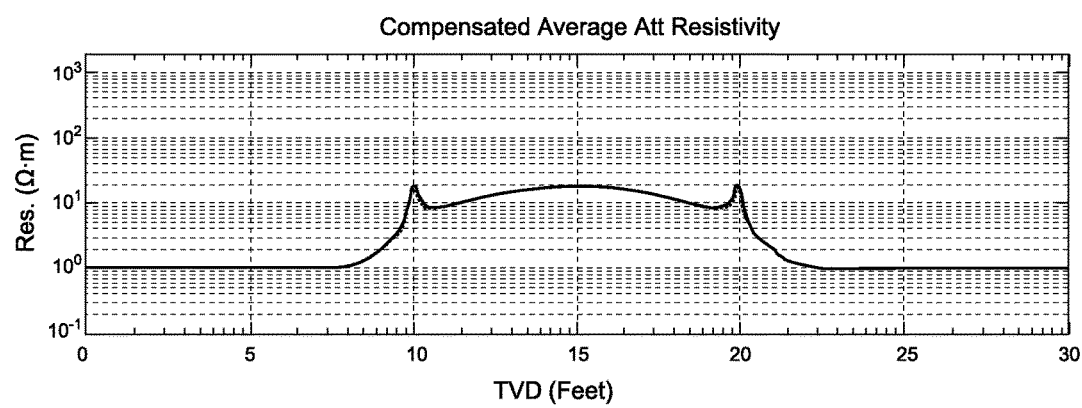
FIG. 7B shows compensated average attenuation resistivity measurements of two tools in the formation model of FIG. 5 with relative dip angle of 85°, according to various embodiments.

As illustrated in FIGS. 7A-7B, the measurements from both tools are essentially the same such that basically only one curve is shown in each of FIGS. 7A-7B. Both tools measure good resistivity reading consistent with true formation resistivity, while the tools are away from the boundaries. However, resistivity reading becomes unrealistic and do not present true formation resistivity value at and near a boundary. Using such unrealistic measurements without performing a 1D inversion, misinterpretation of formation geology can occur.

Figure 8A:
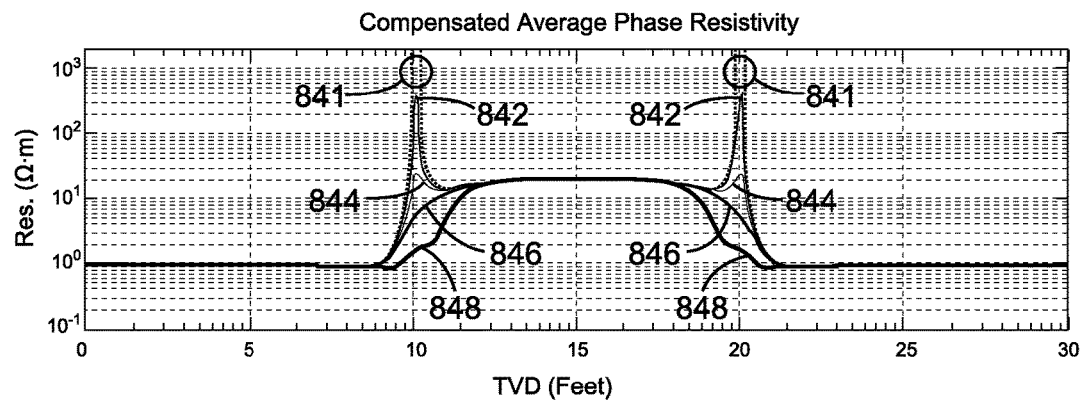
FIG. 8A shows compensated average phase measurements of the tool structure in FIG. 6 with non-tilted transmitters and various tilted receivers in formation model of FIG. 5 with relative dip angle of 85°, according to various embodiments.
Figure 8B:
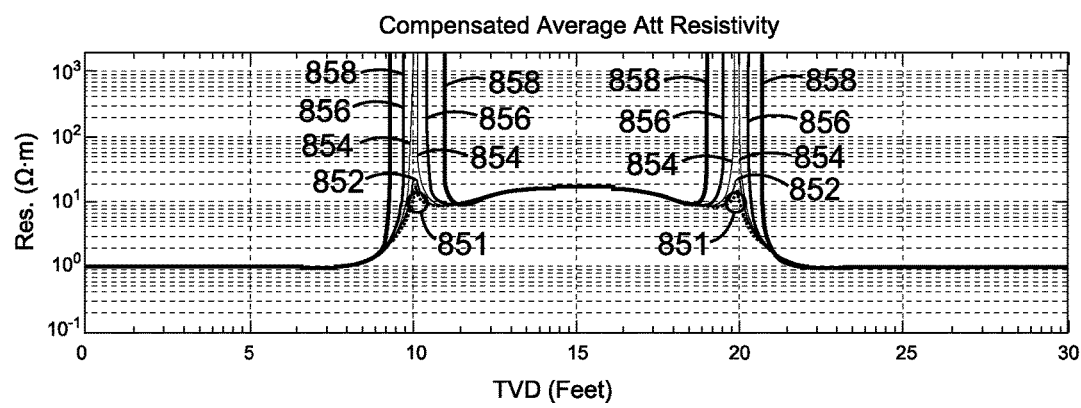
FIG. 8B Compensated average attenuation resistivity measurements of the tool structure in FIG. 6 with non-tilted transmitters and various tilted receivers in formation model of FIG. 5 with relative dip angle of 85°, according to various embodiments.

In various embodiments, techniques are implemented to directly determine true formation resistivity without running a 1D inversion. First, sets of measurements were considered with an arrangement of the measurement tool in FIG. 6 with the transmitters' tilt angle fixed to be 0° and the receivers' tilt angle adjusted from 0° to 85°. Similar to FIGS. 7A-7B with the same formation parameters in FIG. 5 and relative dip angle of 85°, average resistivity measurements were computed with respect to several specific orientations of the receivers with non-tilted transmitters. FIG. 8A shows compensated average phase measurements of the tool structure in FIG. 6 with non-tilted transmitters and various tilted receivers in formation model of FIG. 5 with relative dip angle of 85°. The group 841 of results includes non-tilted transmitters and receivers having tilt angles of 5°, 15°, 25°, 35°, and 45°. Curves 842, 844, 846, and 848 of results are for non-tilted transmitters and receivers having tilt angles of 55°, 65°, 75°, and 85°, respectively. FIG. 8B shows compensated average attenuation resistivity measurements of the tool structure in FIG. 6 with non-tilted transmitters and various tilted receivers in formation model of FIG. 5 with relative dip angle of 85°. The group 851 of results includes non-tilted transmitters and receivers having tilt angles of 5°, 15°, 25°, 35°, and 45°. Curves 852, 854, 856, and 858 of results are for non-tilted transmitters and receivers having tilt angles of 55°, 65°, 75°, and 85°, respectively. The results provide conclusions that some receiver orientations produce very good phase resistivity measurements with no polarization horns and close to true formation resistivity value; on the other hand, at the same receiver orientations, corresponding attenuation resistivity measurements enhance horn effects while the measurement tool is relatively far away from the boundaries.

For example, the tool structure with 85° tilted receivers develops average phase resistivity reading similar to the true resistivity in layers with resistivity value of 1 Ω·m, whereas, in the middle layer with resistivity value of 20 Ω·m, the tool structure with 65° tilted receivers gives average phase resistivity reading close to the formation model. On the other hand, attenuation resistivity responses of the structure with 85° tilted receivers incur a horn effect before the measurement tool passes the boundaries. For example, the horn effect for this structure occurs approximately 0.65 ft before the boundary when tool is located in the 1 Ω·m formation and approximately 0.98 ft before the boundary when tool is located in the 20 Ω·m formation. Consequently, by adjusting the orientations of the receivers, the corresponding phase resistivity measurements can be used to denote true formation resistivity reading and the corresponding attenuation resistivity can be utilized to figure out boundary positions.

Figure 9A:
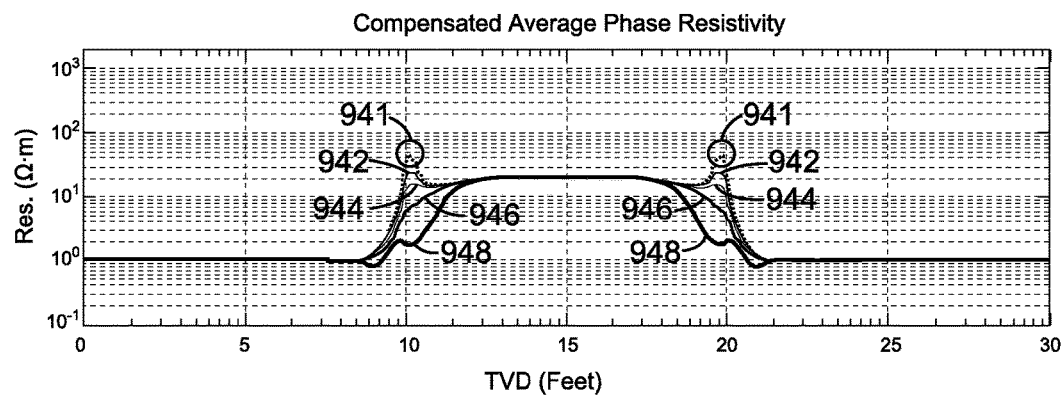
FIG. 9A shows compensated average phase measurements of the tool structure in FIG. 6 with non-tilted transmitters and various tilted receivers in formation model of FIG. 5 with relative dip angle of 75°, according to various embodiments.
Figure 9B:
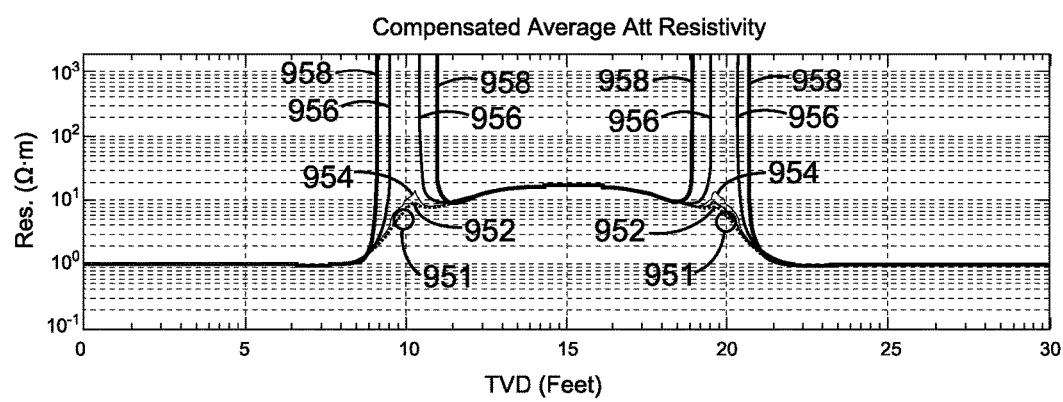
FIG. 9B shows compensated average attenuation resistivity measurements of the tool structure in FIG. 6 with non-tilted transmitters and various tilted receivers in formation model of FIG. 5 with relative dip angle of 75°, according to various embodiments.

FIGS. 9A-9B show the resistivity measurements for the relative dip angle being 75°. FIG. 9A shows compensated average phase measurements of the tool structure in FIG. 6 with non-tilted transmitters and various tilted receivers in formation model of FIG. 5 with relative dip angle of 75°. The group 941 of results includes non-tilted transmitters and receivers having tilt angles of 5°, 15°, 25°, 35°, and 45°. Curves 942, 944, 946, and 948 of results are for non-tilted transmitters and receivers having tilt angles of 55°, 65°, 75°, and 85°, respectively. FIG. 9B shows compensated average attenuation resistivity measurements of the tool structure in FIG. 6 with non-tilted transmitters and various tilted receivers in formation model of FIG. 5 with relative dip angle of 75°. The group 951 of results includes non-tilted transmitters and receivers having tilt angles of 5°, 15°, 25°, 35°, and 45°. Curves 952, 954, 956, and 958 of results are for non-tilted transmitters and receivers having tilt angles of 55°, 65°, 75°, and 85°, respectively. Again, changing receiver orientations has no influence on resistivity measurements if the measurement tool is far away from the boundaries, whereas it enables different resistivity reading nearby the boundary. Such findings can be utilized to directly evaluate true formation resistivity and detect boundary positions.

Figure 10A:
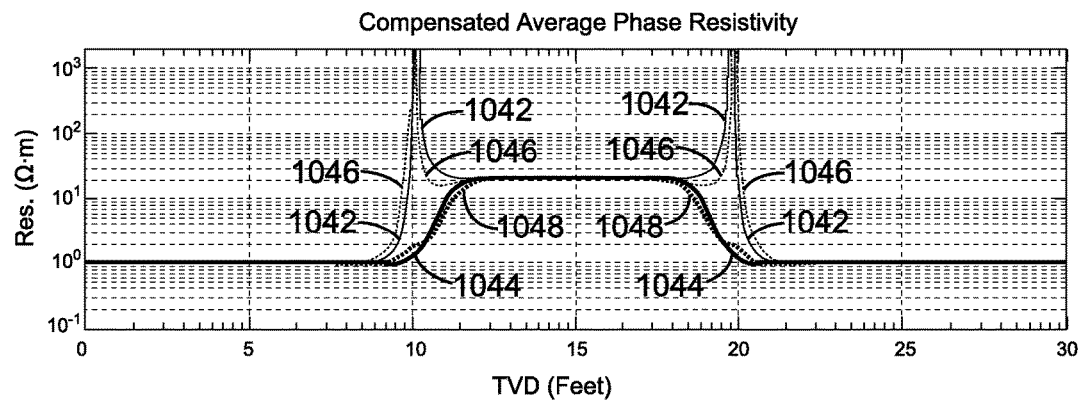
FIG. 10A shows compensated average phase measurements of the tool structure in FIG. 6 with various orientations of the transmitters and the receivers in formation model of FIG. 5 with relative dip angle of 85°, according to various embodiments.
Figure 10B:
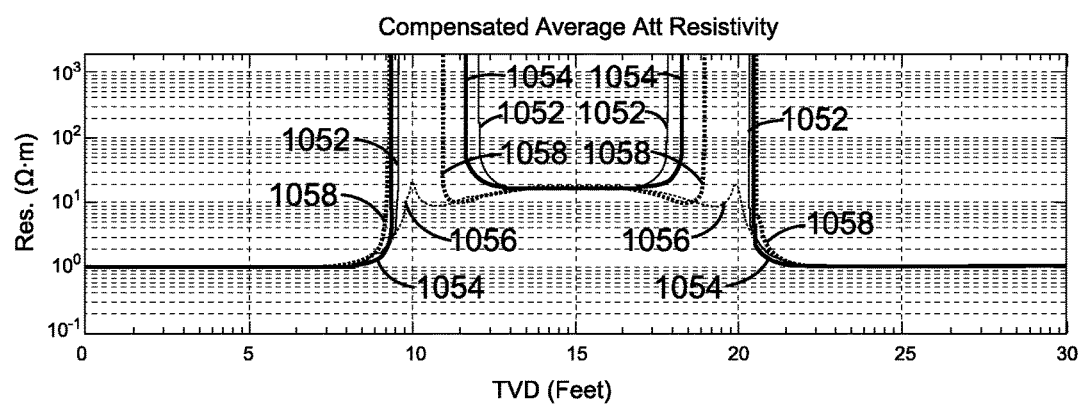
FIG. 10B shows compensated average attenuation resistivity measurements of the tool structure in FIG. 6 with various orientations of the transmitters and the receivers in formation model of FIG. 5 with relative dip angle of 85°, according to various embodiments.

In addition, it has been discovered that resistivity measurements calculated by traditional conversion charts can be also acquired by antenna structures where transmitter(s)' orientations are perpendicular to receiver(s)' orientations. FIGS. 10A-10B show the compensated phase and attenuation resistivity responses at relative dip angle of 85° of two perpendicular arrangements between the transmitter(s) and the receiver(s), where one arrangement has the transmitters' tilt angle of −45° and the receivers' tilt angle of 45° (curves 1042 and 1052) and the other arrangement has the transmitters' tilt angle of 5° and the receivers' tilt angle of −85° (curves 1044 and 1054). FIGS. 10A-10B also compares the resistivity responses of another two structures where both are equipped with non-tilted transmitters but the receivers are tilted at two different tilt angles (curves 1046 and 1056 for receiver tilt angle of 45° and curve 1048 and 1058 for receiver tilt angle of 85°). As illustrated in FIGS. 10A-10B, similar conclusions reveal that phase resistivity measurements of specific antenna orientations significantly reduce or eliminate resistivity horn effects and accurately estimate true formation resistivity; conversely, attenuation resistivity measurements of the same antenna orientations emphasize horn effects and early discovery of nearby boundaries.

The findings discussed above were made with respect to two kinds of tool structures and corresponding simulations that were performed. One tool structure is equipped with non-tilted transmitters and tilted central receivers, and the other structure is established by both tilted transmitters and tilted receivers with perpendicular arrangements between the transmitter(s) and the receiver(s). Owing to reciprocity theorem, all the described transmitters and receivers can be exchangeable. Consequently, similar simulation results and conclusions can be obtained if a transmitter becomes a receiver or a receiver becomes a transmitter.

Consider the tool structure of FIG. 6 with non-tilted transmitters and arbitrary tilted receivers. With a firing of the transmitters ($T_1$ or $T_2$), the voltage received at one of the two central receivers can be written as:

$$V_{R_{ind}}^{T_{ind}}(\phi) = V_{zz}^{T_{ind}R_{ind}} \cos\theta_r + V_{zx}^{T_{ind}R_{ind}} \sin\theta_r \cos\phi \quad (6)$$

Where, $T_{ind}$ indicates transmitters and $R_{ind}$ indicates receivers (ind is 1 or 2), $\phi$ is tool azimuthal angle, $\theta_r$ is tilt angle of the receivers, $V_{zz}^{T_{ind}R_{ind}}$ is a coupling component when the transmitter $T_{ind}$ is orientated in z direction and the receiver $R_{ind}$ is orientated in z direction in FIG. 6, and $V_{zx}^{T_{ind}R_{ind}}$ is a coupling component when the transmitter $T_{ind}$ is orientated in z direction and the receiver $R_{ind}$ is orientated in x direction in FIG. 6. In practice, the measurements of a complete tool rotation are divided by N bins with each at a distinct azimuthal angle $\phi_i$, as shown in FIG. 11. Equation (6) can be modified as $$V_{R_{ind}}^{T_{ind}}(i) = V_{zz}^{T_{ind}R_{ind}} \cos\theta_r + V_{zx}^{T_{ind}R_{ind}} \sin\theta_r \cos\phi_i,$$
$$i = 1, 2, \ldots, N \quad (7)$$

where i denotes different bins defined in FIG. 11. The measurement tool to make measurements in a borehole have the receivers with tilt angles fixed that cannot be randomly changed. In a measurement tool structure for LWD applications, owing to LWD rotating operation, all azimuthal measurements of a complete rotation are available during downhole drilling. Consider an EM tool with tilted receivers, having tilt angle of $\theta_{r1}$, $\theta_{r1} \neq 0$, and non-tilted transmitters. Based on equation (7), an average of all azimuthal measurements of a complete rotation can be expressed as:

$$\frac{1}{N}\sum_{i=1}^{N} V_{R_{ind}}^{T_{ind}}(i) = V_{zz}^{T_{ind}R_{ind}} \cos\theta_{r1} \quad (8)$$

Equation (9) can be derived from equation (7) and equation (8) to obtain a new azimuthal measurement $V_{R_{ind}}^{T_{ind}}(i)$ received at the same receiver but with different tilt angle, $\theta_{r2}$:

$$V_{R_{ind}}^{T_{ind}'}(i) = V_{R_{ind}}^{T_{ind}}(i) \times \frac{\sin\theta_{r2}}{\sin\theta_{r1}} + \frac{2}{N}\sum_{i=1}^{N} V_{R_{ind}}^{T_{ind}}(i) \times \frac{\sin(\theta_{r1} - \theta_{r2})}{\sin(2\theta_{r1})}, \quad (9)$$
$$i = 1, 2, \ldots, N$$

Since $\theta_{r1}$ is known and defined by the tool design, equation (9) presents an approach to calculate the new azimuthal measurements $V_{R_{ind}}^{T_{ind}'}(i)$ associated with the desired tilted receivers with tilt angle $\theta_{r2}$ on the basis of raw measurements $V_{R_{ind}}^{T_{ind}}(i)$.

Consider the tool structure of FIG. 6 with both tilted transmitters and tilted receivers with perpendicular arrangement between the transmitter(s) and the receiver(s). A measurement signal received at a receiver corresponding to the transmitting signal of a transmitter can be expressed as:

$$V_{R_{ind}}^{T_{ind}}(i) = -\frac{V_{xx}^{T_{ind}R_{ind}} - V_{yy}^{T_{ind}R_{ind}}}{4}\cos 2\phi_i - \frac{V_{xy}^{T_{ind}R_{ind}} + V_{yx}^{T_{ind}R_{ind}}}{4}\sin 2\phi_i - \frac{V_{xz}^{T_{ind}R_{ind}} - V_{zx}^{T_{ind}R_{ind}}}{2}\cos\phi_i - \frac{V_{yz}^{T_{ind}R_{ind}} - V_{zy}^{T_{ind}R_{ind}}}{2}\sin\phi_i + \frac{2V_{zz}^{T_{ind}R_{ind}} - V_{xx}^{T_{ind}R_{ind}} - V_{yy}^{T_{ind}R_{ind}}}{4}, i = 1, 2, \ldots, N \quad (10)$$

$V_{jk}^{T_{ind}R_{ind}}$ is a coupling component when the transmitter $T_{ind}$ is orientated in j direction and the receiver $R_{ind}$ is orientated in k direction in FIG. 6; j or k denotes x, y, or z direction.

Consequently, nine coupling components are essential to decouple equation (10) and then calculate new measurements of desired antenna orientations. This demonstrates that the related processing schemes are more complicated for a tool structure with tilted transmitters and tilted receivers than the tool structure with non-tilted transmitters and tilted receivers.

Figure 12A:
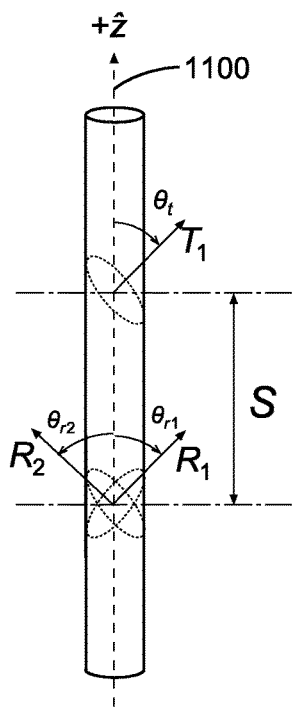
FIGS. 12A-12C show tool antenna structures and defined quadrants for tools arranged with antennas having tilted angles, according to various embodiments.
Figure 12B:
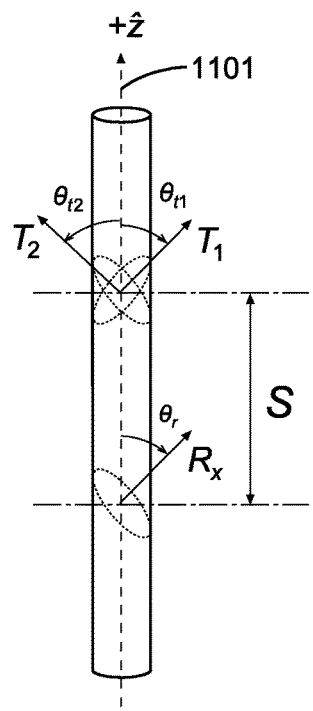
Figure 12C:
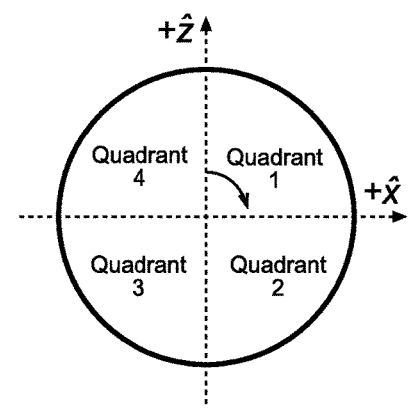
Figure 13C:
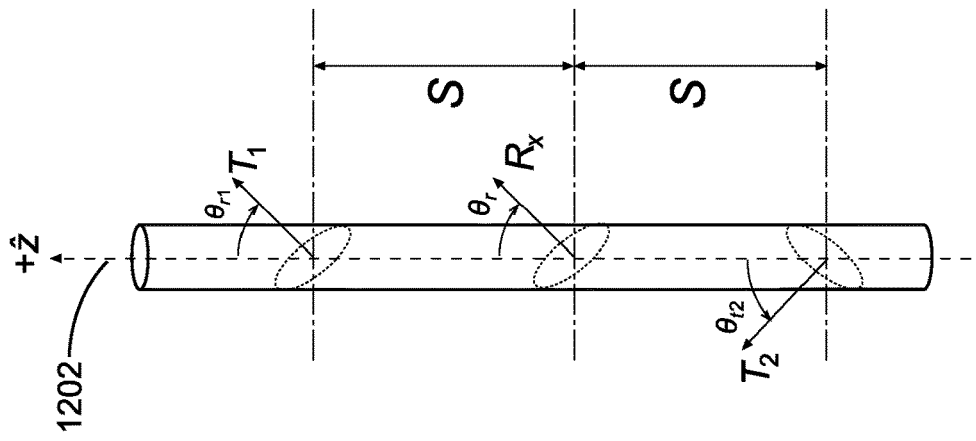
FIGS. 13A-13C show tool antenna structures to provide similar functionalities as structures in FIGS. 12A-12B, according to various embodiments.
Figure 13B:
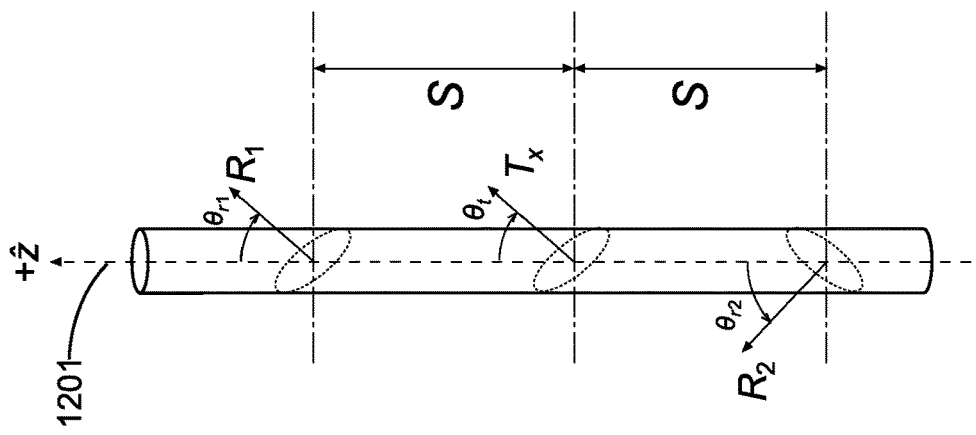
Figure 13A:
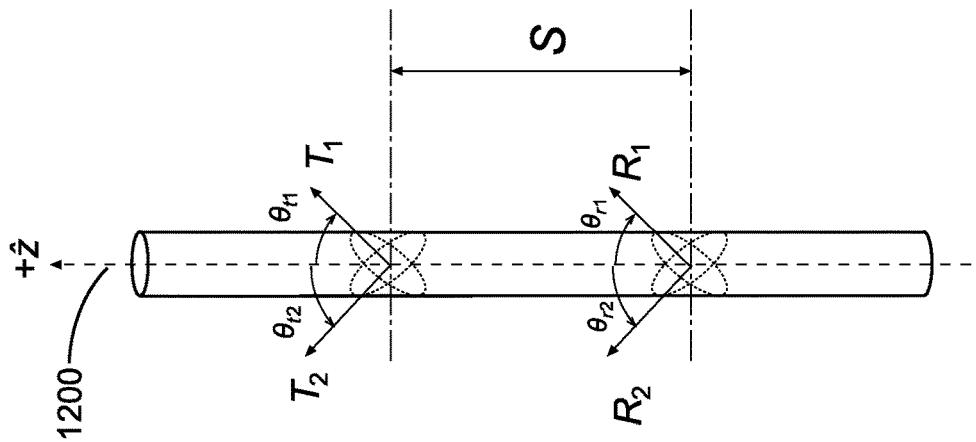
Figure 14A:
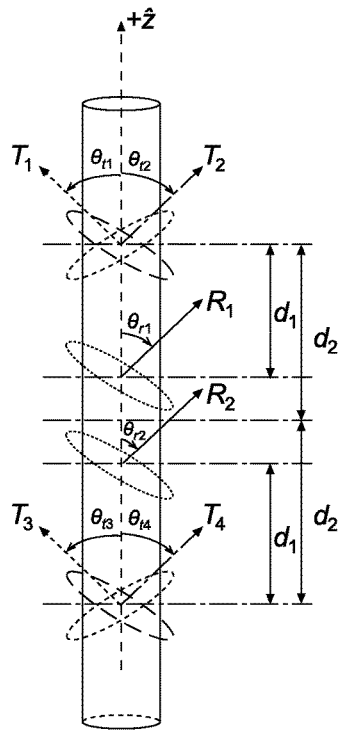
FIGS. 14A-14C show tool antenna structures to provide compensated resistivity measurements with respect to arbitrary tilted transmitter(s) and tilted receiver(s), according to various embodiments.
Figure 14B:
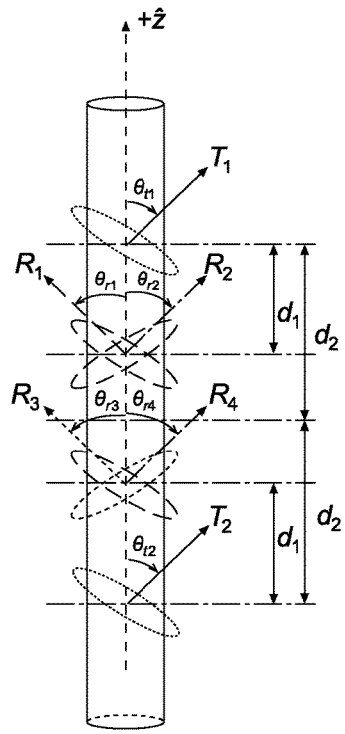
Figure 14C:
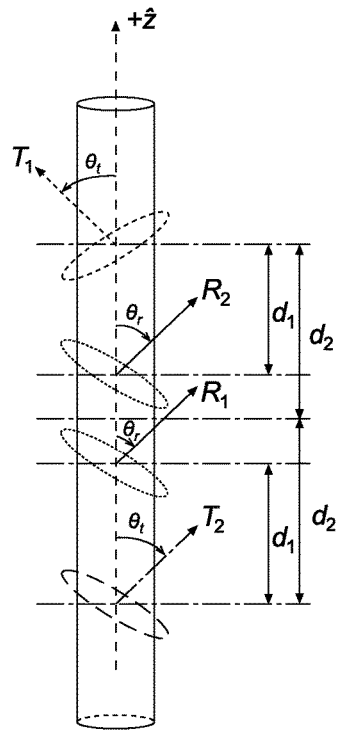

In order to adjust both transmitter(s) and receiver(s) orientations and obtain new measurements with respect to arbitrary antenna orientations, a multi-component antenna system can be utilized. FIGS. 12A-12B show examples of antenna designs to achieve such purpose. The tool must be equipped with at least one tilted transmitter and two tilted receivers, or one tilted receiver and two tilted transmitters, where the two antennas (either transmitters or receivers in FIGS. 12A-12B) are located at the same position with same distance (S) to the third antenna. Thus, one of the two antennas that are placed at the same position in FIGS. 12A-12B can have an arbitrary tilted angle in any quadrants of FIG. 12C, the other must have a tilted angle in the quadrant adjacent to the quadrant in which the first antenna orientation is, and the third antenna can be tilted at arbitrary angle. For example, if $\theta_{r1}$ (or $\theta_{t1}$) in FIGS. 12A-12B is in quadrant 1 of FIG. 12C, $\theta_{r2}$ (or $\theta_{t2}$) must be in either quadrant 2 or quadrant 4 of FIG. 12C. In addition, FIGS. 13A-13C show more tool structures that having the capacity to attain the same functionalities as the structures in FIGS. 12A-12B. It is noted that transmitter(s) and receiver(s) can be exchangeable in both FIGS. 12A-12B and FIGS. 13A-13C. In addition, FIGS. 14A-14C illustrate the structures that are capable of acquiring compensated measurements with respect to arbitrary transmitter(s) and receiver(s) orientations to achieve desired resistivity measurements on the basis of the processing schemes discussed herein.

Figure 15:
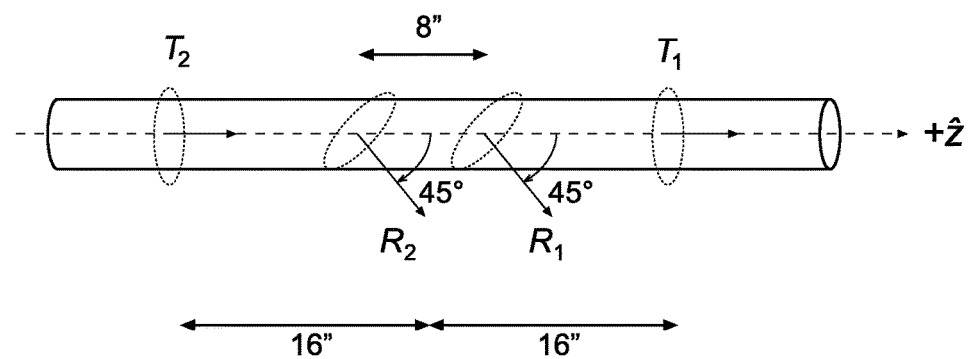
FIG. 15 shows a configuration of a measurement tool structured to provide deep azimuthal resistivity measurements, according to various embodiments.
Figure 16A:
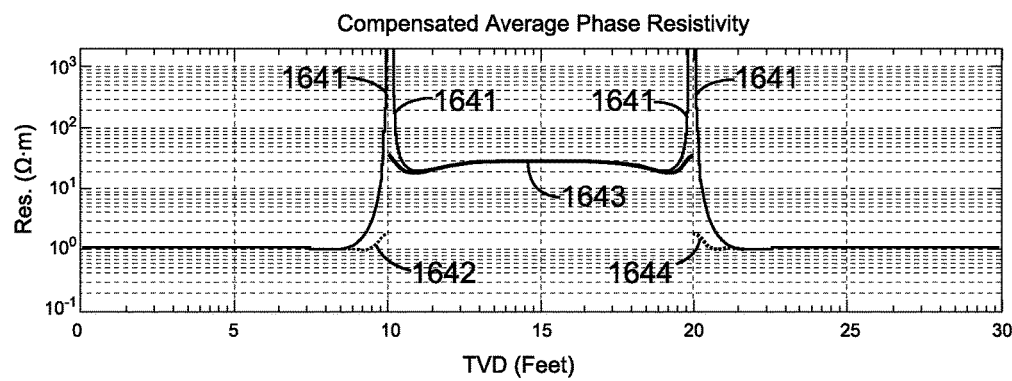
FIG. 16A shows compensated average phase resistivity responses from the measurement tool of FIG. 15 for two specific tilted receivers, according to various embodiments.
Figure 16B:
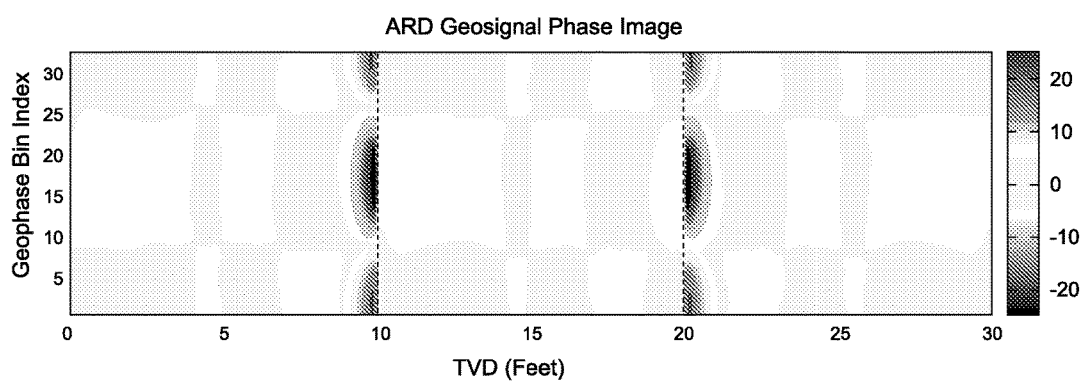
FIG. 16B shows a geosignal phase image from the measurement tool of FIG. 15, according to various embodiments.

A geosignal is also an important parameter to predict when the measurement tool is approaching, leaving, or passing the boundary between layers. FIG. 15 shows a configuration of a measurement tool structured to provide deep azimuthal resistivity measurements that is available as a commercial LWD tool, as an example. FIG. 15 shows one spacing of 16 inches of antenna structures with non-tilted transmitters and 45° tilted receivers. FIG. 16A shows compensated average phase resistivity responses from the measurement tool of FIG. 15 for two specific tilted receivers having tilt angles of 85° and 65°. The compensated average phase resistivity of the structure of FIG. 15 is depicted by curve 1641. FIG. 16B shows a geosignal phase image from the measurement tool of FIG. 15, with respect to the formation model of FIG. 5 with the relative dip angle of 85°. The geosignal image for this case was provided with respect to the number of total bins per rotation being 32.

FIG. 16A shows that as the measurement tool approaches the first boundary at TVD of 10 ft, at around 9.3 ft, the geosignal shows significant responses. Also, based on the positive and negative sign of the geosignal azimuthal responses, it demonstrates that drilling is from a layer with lower resistivity to a layer with higher resistivity. Consequently, at TVD of 9.3 ft, the phase resistivity can be retrieved by adjusting the tilt angle of the central receivers to 85° tilt angle using the techniques discussed herein. The new phase resistivity reading is illustrated in FIG. 16A by curve 1642. After passing the first boundary, the sign of the geosignal responses changes and predicts that the tool is now located in the layer with higher resistivity value. At this moment, the phase resistivity reading can be recalculated by 65° tilt angle receivers, indicated in curve 1643, in the middle layer. While the measurement tool is passing the second boundary at TVD of 20 ft, the sign of the geosignal responses changes again and a new phase resistivity can be determined by 85° tilted receivers, indicated in curve 1644, owing to expecting the new layer with lower resistivity value on the basis of the sign changes of the geosignal azimuthal responses. Consequently, curve 1642, curve 1643, and curve 1644 of FIG. 16A can be combined to estimate resistivity reading very close to true formation models and to effectively eliminate horn effects of phase resistivity reading, depicted in curve 1641, of the measurement tool structured to provide deep azimuthal resistivity measurements of FIG. 15.

The tool arrangement in FIG. 15 includes the transmitters being non-tilted in the geosignal application discussed above to determine an estimate of true formation resistivity and to effectively eliminate horn effects. Geosignal phase image and similar processing schemes to determine true formation resistivity can be also achieved by both tilted transmitters and tilted receivers with perpendicular arrangements between the transmitter(s) and the receiver(s). Other arrangements may be used that can take advantage of the tilt angle transformation scheme discussed herein.

Figure 17:
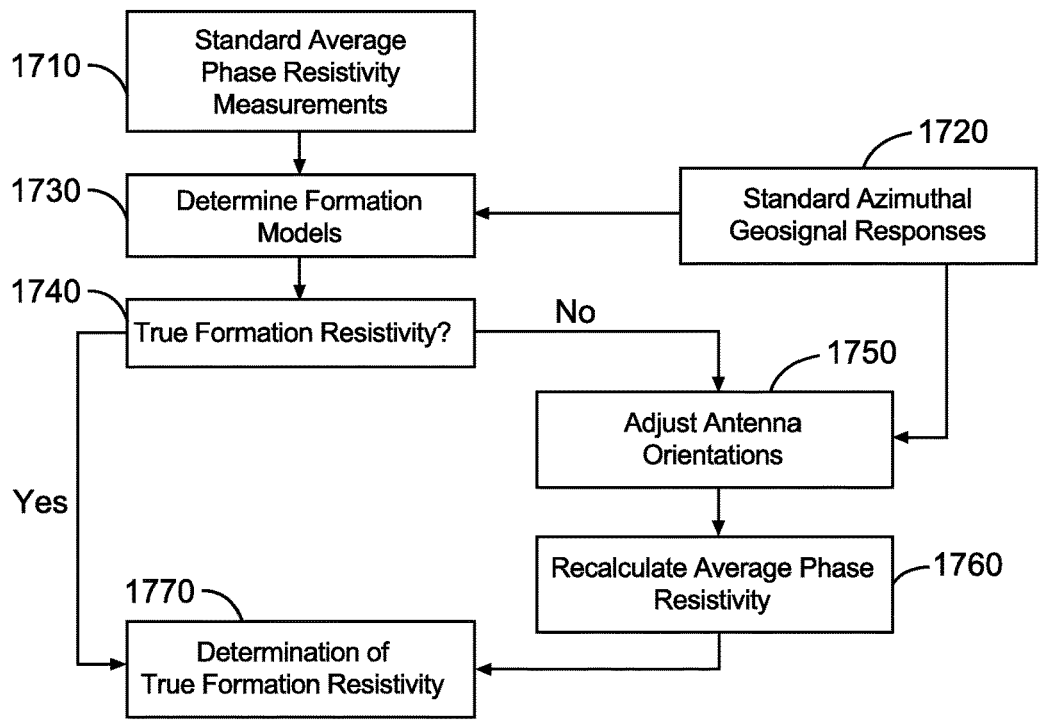
FIG. 17 shows a flowchart of an example processing scheme to determine true formation resistivity, according to various embodiments.

FIG. 17 shows a flowchart of an example embodiment of a processing scheme to determine true formation resistivity. At 1710, regular measurements for average phase resistivity are performed using a physical measurement tool structure downhole and average phase resistivity is calculated based on this tool structure. At 1720, corresponding geosignal responses are utilized. The corresponding geosignal responses can include those generated from the measurements relative to the tool structure. At 1730, these corresponding geosignal responses are applied to determine formation models. These formation models can include resistivity as a function of layer position. At 1740, a determination is made as to whether the measured resistivity is true formation resistivity or not based on the utilization of the geosignal responses. If the geosignal responses identify significant signals, there should be a boundary nearby and the resistivity reading may not be accurate. Without a boundary, the geosignal responses are essentially zero. At 1750, if significant signals are identified, an adjustment to antenna orientations is identified. At 1760, the identified adjustments to the antenna orientations can be processed to transform the measurement values from operation of the physical measurement tool structure to measurement values corresponding to the adjustments to the antenna orientations and to recalculate the average phase resistivity. The adjustment using geosignal responses may be directed to a best antenna orientation from stored data or may be an iterative process. At 1770, a determination of a true formation resistivity is made based on the use of the geosignal responses. Thus, the processing scheme can use recalculation of new average phase resistivity readings associated with specific antenna orientations based on geosignal responses. At the end, this processing scheme can obtain accurate resistivity measurements and avoid polarization horn effects.

Figure 18:
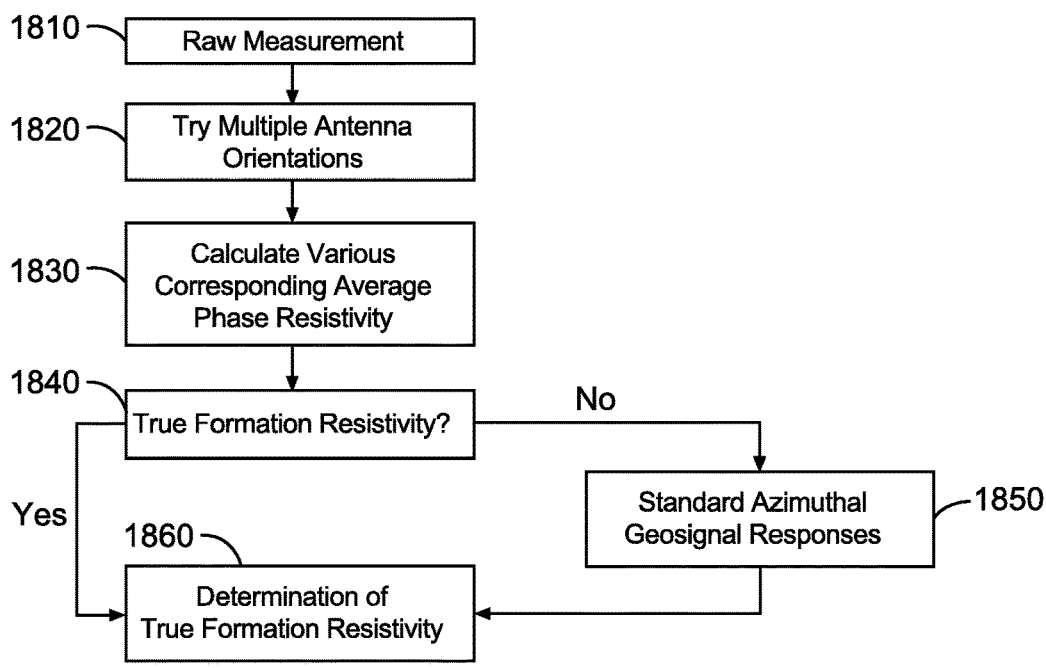
FIG. 18 shows a flowchart of an example processing scheme to determine true formation resistivity, according to various embodiments.

FIG. 18 shows a flowchart of an example embodiment of a processing scheme to determine true formation resistivity. At 1810, raw measurements are acquired from a measurement tool operating in a borehole with an arrangement of antennas. At 1820, multiple antenna orientations are applied to the raw measurements. These multiple antenna orientations can be used to transform the raw measurements to new measurements in accordance with techniques discussed herein. At 1830, various average phase resistivities are calculated corresponding to the multiple antenna orientations to obtain several average phase resistivity measurements. At 1840, a determination can be made as to whether these average phase resistivity measurements provide an estimate of a true formation resistivity. If no boundary effect exists, all the phase resistivity measurements should be identical, meaning the phase resistivity measurements estimate true formation resistivity. However, if differences exist among the phase resistivity measurements associated with distinct antenna orientations, standard Geosignal responses are be included, at 1850, to determine a proper resistivity reading for determination of true formation resistivity at 1860.

Various transformation techniques to provide new measurement values from raw measurements similar to or identical to techniques discussed herein can be applicable to different processing schemes. Such combinations of transformation techniques and processing schemes can provide very fast and simple methodology to significantly reduce or eliminate horn effects and directly detect true formation resistivity. In addition, such combinations can be used to attain a resistivity value that can be applied as an initial guess of 1D inversion, and afterward perform inversion to optimize the inverted formation geology.

Figure 19A:
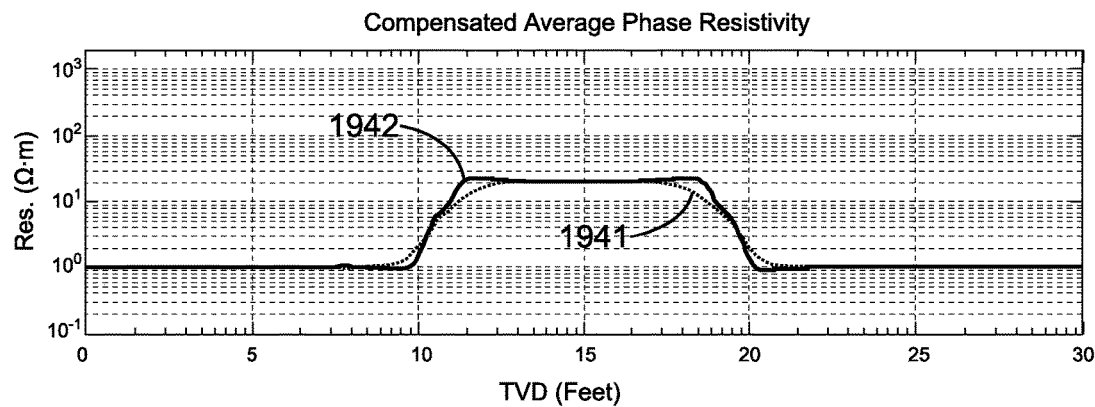
FIG. 19A shows compensated average phase measurements of the tool structure in FIG. 6 with various orientations of the transmitters and the receivers in formation model of FIG. 5 with relative dip angle of 0°, according to various embodiments.
Figure 19B:
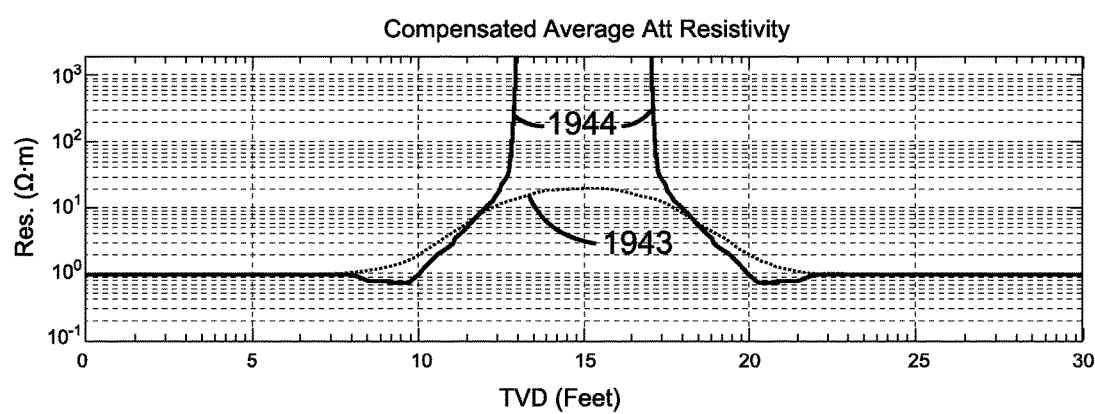
FIG. 19B shows compensated average attenuation resistivity measurements of the tool structure in FIG. 6 with various orientations of the transmitters and the receivers in formation model in FIG. 5 with relative dip angle of 0°, according to various embodiments.

Techniques discussed above are basically used during horizontal and deviated drilling. In vertical drilling with 0° relative dip angle, these techniques are not able to adjust antenna orientations as described above. FIG. 19A shows compensated average phase measurements of the tool structure in FIG. 6 with various orientations of the transmitters and the receivers in formation model of FIG. 5 with relative dip angle of 0°. FIG. 19B shows compensated average attenuation resistivity measurements of the tool structure in FIG. 6 with various orientations of the transmitters and the receivers in formation model of FIG. 5 with relative dip angle of 0°. The various orientations included non-tilted transmitters with receivers tilted at 5°, 25°, 45°, 65°, and 85° and tilted orientation pairs of $(\theta_t, \theta_r) = (45°, 45°)$, $(25°, 65°)$, and $(5°, 85°)$. However, FIGS. 19A-19B each essentially show two curves (curves 1941 and 1943 corresponding to non-tilted transmitter arrangements and curves 1942 and 1944 corresponding to tilted transmitter arrangements), since the results for all orientations with non-titled transmitters have essentially the same responses and the results for all orientations with both tilted transmitters and receivers have essentially identical results.

For the cases with non-tilted transmitters corresponding to drilling in a vertical well with 0° relative dip angle, the coupling component of $V_{zx}^{T_{ind}R_{ind}}$ will be null and thereby the received signal in equation (7) is revised as $$V_{R_{ind}}^{T_{ind}}(i) = V_{zz}^{T_{ind}R_{ind}} \cos\theta_r, \; i=1,2,\ldots,N \quad (11)$$

Since the resistivity measurement is calculated by the ratio between the signals at the central receivers with one firing of the two transmitters in FIG. 6, the ratio signal can be expressed as $$\frac{V_{R_2}^{T_{ind}}(i)}{V_{R_1}^{T_{ind}}(i)} = \frac{V_{zz}^{T_{ind}R_2}\cos\theta_r}{V_{zz}^{T_{ind}R_1}\cos\theta_r} = \frac{V_{zz}^{T_{ind}R_2}}{V_{zz}^{T_{ind}R_1}}, \; i=1,2,\ldots,N \quad (12)$$

Therefore, equation (12) explains that the tilt angle of the receivers have no impact on the average resistivity measurements. On the other hand, for the cases with both tilted transmitters and tilted receivers corresponding to drilling in the vertical well, all the cross-coupling components $(V_{xy}^{T_{ind}R_{ind}}, V_{yx}^{T_{ind}R_{ind}}, V_{xz}^{T_{ind}R_{ind}}, V_{zx}^{T_{ind}R_{ind}}, V_{yz}^{T_{ind}R_{ind}},$ and $V_{zy}^{T_{ind}R_{ind}})$ are null and the direct-coupling components of $V_{xx}^{T_{ind}R_{ind}}$ and $V_{yy}^{T_{ind}R_{ind}}$ are the same. Consequently, received signal in equation (10) can be modified as $$V_{R_{ind}}^{T_{ind}}(i) = \frac{V_{zz}^{T_{ind}R_{ind}} - V_{xx}^{T_{ind}R_{ind}}}{2}, \; i=1,2,\ldots,N \quad (13)$$

It can be seen that tools with any tilt angle of transmitters and receivers will have the same received signals during vertical drilling with very low relative dip angle. It is noted that resistivity polarization horn effects do not exist in vertical drilling (0° relative dip angle) so that conventional resistivity measurements can be directly used for geology interpretation and/or 1D formation inversion in vertical drilling (0° relative dip angle) applications. Thus, the embodiments of processing techniques described herein need not be applied for a vertical drilling (0° relative dip angle) operation.

All methods mentioned above are implemented by virtually adjusting antenna orientations to eliminate resistivity polarization horn effects in the new measurements. On the other hand, the methods can also be implemented by physically adjusting antenna orientations to attain the same results. For the physical adjustment of antenna orientations, the control unit 115 in FIG. 1 can be operable to assign the desired antenna orientation to a particular transmitter or receiver sensor such that the sensor can be physically orientated. Then the processing unit 120 in FIG. 1 can thereafter acquire the real measurements from the new physically orientated transmitter and receiver sensors.

In various embodiments, useful processing schemes are provided to eliminate resistivity polarization horn effects and further determine true formation resistivity. These processing schemes can be implemented using azimuthal LWD propagation wave tools. These processing schemes can provide simple and fast techniques to understand formation geology and directly compute true formation resistivity without 1D inversion, which may provide an enhancement over approaches in which resistivity horn effects often occur during horizontal drilling accompanied by misinterpretation of formation geology if a 1D inversion is not performed. Such technologies are applicable to a number of different commercial tools. In addition, using such processing schemes may be beneficial for field operations in which 1D inversion results may be improved and related real-time applications may be optimized, such as distance to bed boundary inversion (DTBB).

Figure 20:
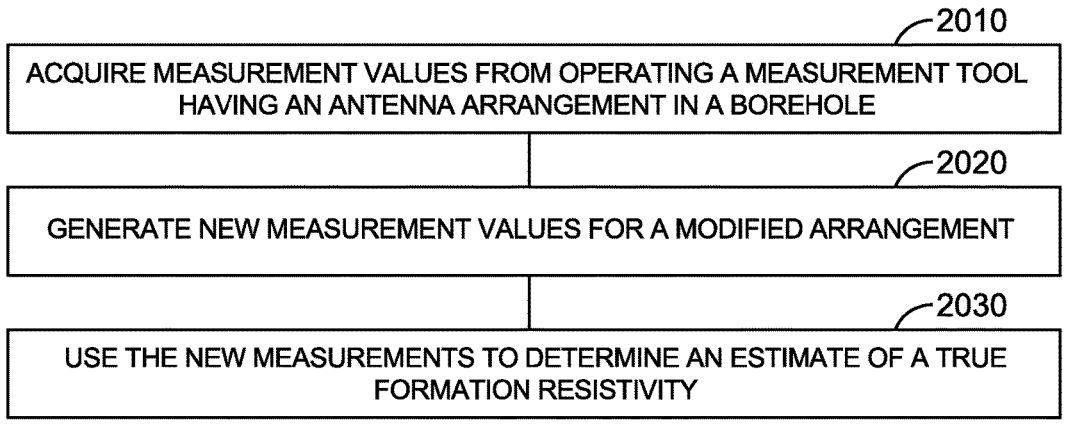
FIG. 20 shows features of an example method to determine true formation resistivity, in accordance with various embodiments.

FIG. 20 shows features of an embodiment of an example method to determine true formation resistivity. At 2010, measurement values are acquired from operating a measurement tool in a borehole. The measurement tool obtaining the measurement values has an arrangement of transmitter and receiver antennas. Acquiring measurement values can include acquiring values from making measurements during a rotation of the measurement tool, the rotation of the measurement tool partitioned into N bins, in which completion of the N bins is one complete rotation of the measurement tool, N≥2, where N is the total number of bins.

At 2020, new measurement values are generated for a modified arrangement. The modified arrangement may be a virtual arrangement. The modified arrangement has the same transmitter and receiver antennas as the arrangement with the orientation of transmitter antennas, receiver antennas, or both the transmitter and receiver antennas adjusted from the orientation of the arrangement. The new measurement values can be generated by processing the measurement values from operating the measurement tool using a relationship including the tilt angle of a receiver antenna in the arrangement and the tilt angle of the same receiver antenna in the modified arrangement, where the tilt angle of the receiver antenna in the arrangement is different from the tilt angle of the same receiver antenna in the modified arrangement. Generating new measurement values can include generating $V_{R_{ind}}^{T_{ind}}{}'(i)$ according to $$V_{R_{ind}}^{T_{ind}}{}'(i) = V_{R_{ind}}^{T_{ind}}(i) \times \frac{\sin\theta_{r2}}{\sin\theta_{r1}} + \frac{2}{N}\sum_{i=1}^{N} V_{R_{ind}}^{T_{ind}}(i) \times \frac{\sin(\theta_{r1} - \theta_{r2})}{\sin(2\theta_{r1})},$$

$$i = 1, 2, \ldots, N$$

for the arrangement having at least two or more receiver antennas and at least one or more transmitter antennas, where $T_{ind}$ indicates different transmitters and $R_{ind}$ indicates different receivers, $V_{R_{ind}}^{T_{ind}}(i)$ is the signal measured at receiver $R_{ind}$, in response to a signal being transmitted from transmitter $T_{ind}$, in bin i, i=1 ... N, and $V_{R_{ind}}^{T_{ind}}{}'(i)$ is the new measurement value for the receiver antenna $R_{ind}$ at tilt angle $\theta_{r2}$ in the modified arrangement with the receiver antenna $R_{ind}$ at tilt angle $\theta_{r1}$ in the arrangement at which the measurement values from operating the measurement tool are acquired. The transmitters can be non-tilted in the arrangement and in the modified arrangement. The transmitters can be tilted in the arrangement such that the transmitters are perpendicular to the receivers. Generating new measurement values can include determining coupling components to calculate $V_{R_{ind}}^{T_{ind}}(i)$ from which $V_{R_{ind}}^{T_{ind}}{}'(i)$ is generated. The arrangement can include at least one or more transmitters or at least two or more receivers arranged such that separation between each transmitter and each receiver is at a fixed distance At 2030, the new measurements are used to determine an estimate of a true formation resistivity. The estimate of the true formation resistivity can be used as an initial guess in a one-dimensional or multi-dimensional inversion procedure such that an inverted geology formation is optimized. The method can be conducted in real time. In an embodiment, a method associated with FIG. 20 can include physically adjusting the arrangement of the transmitter and the receiver antennas to form new oriented transmitter and receiver antennas; obtaining measurements from the new oriented transmitter and receiver antennas; and using the new measurements to determine the estimate of a true formation resistivity.

Figure 21:
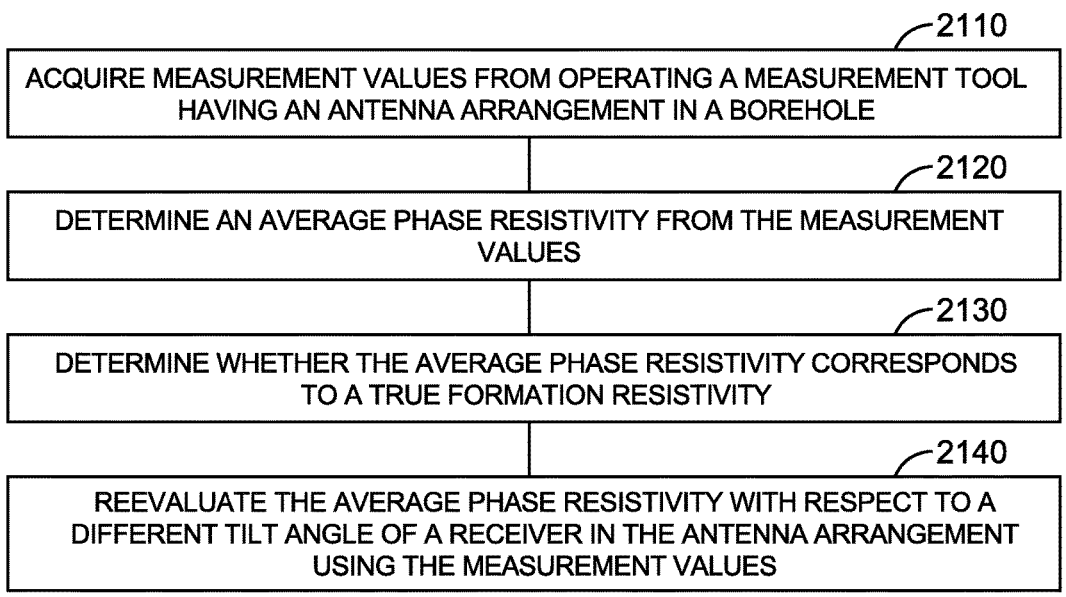
FIG. 21 shows features of an example method to determine true formation resistivity, in accordance with various embodiments.

FIG. 21 shows features of an embodiment of an example method to determine true formation resistivity. At 2110, measurement values are acquired from operating a measurement tool in a borehole. The measurement tool obtaining the measurement values has an arrangement of transmitter and receiver antennas. Acquiring measurement values can include acquiring values from making measurements during a rotation of the measurement tool, the rotation of the measurement tool partitioned into N bins, in which completion of the N bins is one complete rotation of the measurement tool, N≥2, where N is the total number of bins. At 2120, an average phase resistivity is determined from the measurement values.

At 2130, a determination is made as to whether the average phase resistivity corresponds to a true formation resistivity. Determining whether the average phase resistivity corresponds to a true formation resistivity can include determining whether the measurement tool is near a boundary when acquiring the measurement values. Geosignals can be generated from operating the measurement tool in the borehole and the geosignals can be used to determine whether the measurement tool is near a boundary when acquiring the measurement values.

At 2140, the average phase resistivity can be reevaluated with respect to a different tilt angle of a receiver in the antenna arrangement using the measurement values. The reevaluation can be based on the determination regarding true formation resistivity. Reevaluating the average phase resistivity can include transforming the acquired measurement values such that a signal corresponding to a signal at the receiver having a tilt angle in the arrangement from transmitting a signal from a transmitter in the arrangement is converted to a signal at the receiver having a different tilt angle. Transforming the acquired measurement values can include adjusting the acquired measurement values with respect to coupling components. The reevaluated average phase resistivity can be used as an initial guess in a one-dimensional or multi-dimensional inversion procedure such that an inverted geology formation is optimized. The method can be conducted in real time.

Reevaluating the average phase resistivity with respect to a different tilt angle of a receiver in the original antenna arrangement using the measurement values can include a physical adjustment to the arrangement. In an embodiment, a method can include acquiring measurement values from operating a measurement tool in a borehole, the measurement tool having an antenna arrangement; determining an average phase resistivity from the measurement values; determining whether the average phase resistivity corresponds to a true formation resistivity; physically adjusting the arrangement of the transmitter and the receiver antennas, forming new oriented transmitter and receiver antennas; obtaining measurements from the new oriented transmitter and receiver antennas; and using the new measurements to evaluate the average phase resistivity. The average phase resistivity from new measurements can be used as an initial guess in a one-dimensional or multi-dimensional inversion procedure such that an inverted geology formation is optimized. The method can be conducted in real time.

Figure 22:
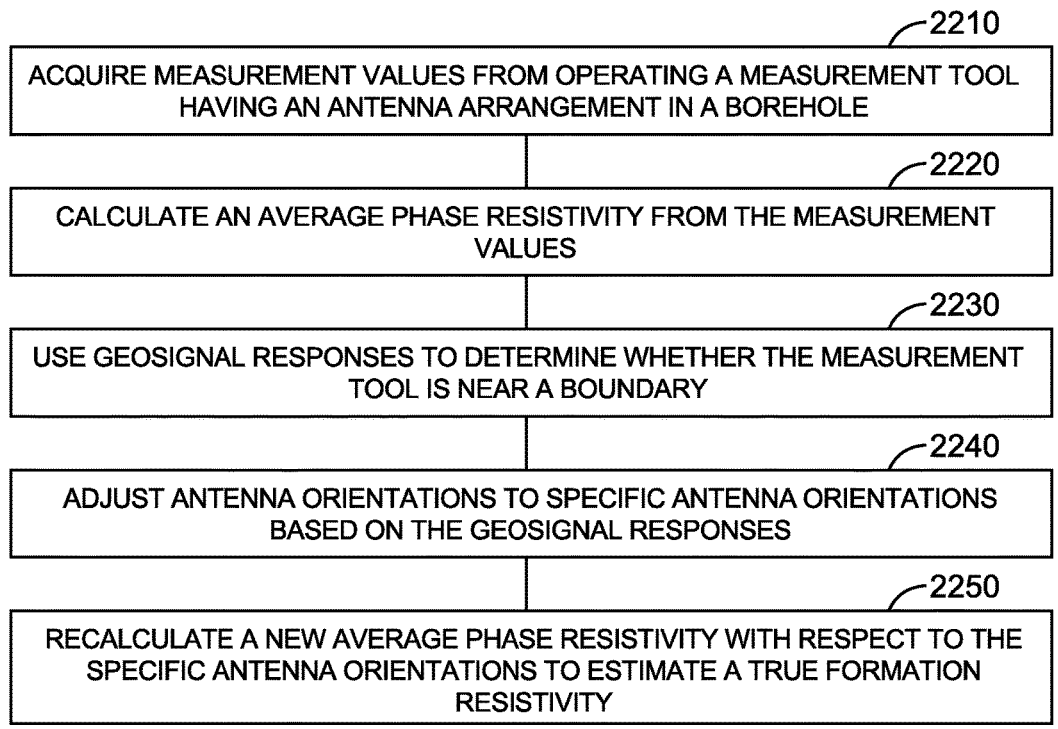
FIG. 22 shows features of an example method to determine true formation resistivity, in accordance with various embodiments.

FIG. 22 shows features of an embodiment of an example method to determine true formation resistivity. At 2210, measurement values are acquired from operating a measurement tool in a borehole. The measurement tool obtaining the measurement values has an arrangement of transmitter and receiver antennas. Acquiring measurement values can include acquiring values from making measurements during a rotation of the measurement tool, the rotation of the measurement tool partitioned into N bins, in which completion of the N bins is one complete rotation of the measurement tool, N≥2, where N is the total number of bins.

At 2220, an average phase resistivity is calculated from the measurement values. At 2230, geosignal responses are used to determine whether the measurement tool is near a boundary.

At 2240, antenna orientations are adjusted to specific antenna orientations based on the geosignal responses. Adjusting to specific antenna orientations can be conducted virtually or physically. The specific antenna orientations can be at least in part different from antenna orientations of the antenna arrangement. The antenna arrangement can include at least one or more non-tilted transmitters and at least two or more receivers having a same tilt angle and the specific antenna orientations have the at least two or more receivers with a tilt angle different from the tilt angle of the antenna arrangement. The antenna arrangement can include at least one or more tilted transmitters arranged perpendicular to at least two or more receivers having a same tilt angle and the specific antenna orientations have the receivers with a tilt angle different from the tilt angle of the antenna arrangement. A voltage signal can be determined at one receiver of the receivers in response to one of the transmitters generating a signal in the antenna arrangement and the voltage signal is transformed to a new voltage signal of the one receiver by processing based on the same tilt angle and a tilt angle of the specific orientation that is different from the same tilt angle.

At 2250, a new average phase resistivity is recalculated with respect to the specific antenna orientations to estimate a true formation resistivity. The recalculated new average phase resistivity can be used as an initial guess in a one-dimensional or multi-dimensional inversion procedure such that an inverted geology formation is optimized. The method can be conducted in real time.

Figure 23:
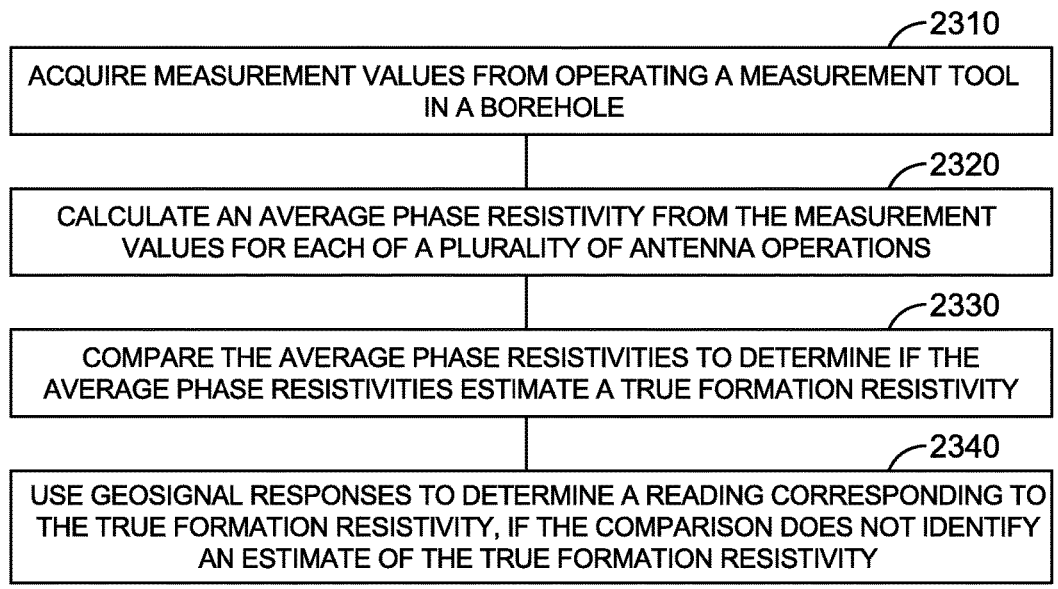
FIG. 23 shows features of an example method to determine true formation resistivity, in accordance with various embodiments.

FIG. 23 shows features of an embodiment of an example method to determine true formation resistivity. At 2310, measurement values are acquired from operating a measurement tool in a borehole. The measurement tool obtaining the measurement values has an arrangement of transmitter and receiver antennas. Acquiring measurement values can include acquiring values from making measurements during a rotation of the measurement tool, the rotation of the measurement tool partitioned into N bins, in which completion of the N bins is one complete rotation of the measurement tool, N≥2, where N is the total number of bins.

At 2320, an average phase resistivity is calculated from the measurement values for each of a plurality of antenna orientations. The plurality of antenna orientations can include the antenna arrangement.

At 2330, the average phase resistivities can be compared to determine if the average phase resistivities estimate a true formation resistivity. Comparing the average phase resistivities can include determining if magnitudes of respective differences between the average phase resistivities are greater than a threshold. The threshold can be set to zero. However, noise and imperfections can cause the threshold to be non-zero. To take such small variances into consideration, the threshold can be an error amount greater than zero.

At 2340, geosignal responses are used to determine a reading corresponding to the true formation resistivity, if the comparison does not identify an estimate of the true formation resistivity. The reading corresponding to the true formation resistivity can be used as an initial guess in a one-dimensional or multi-dimensional inversion procedure such that an inverted geology formation is optimized. The method can be conducted in real time.

In various embodiments, sets of measurement values from operating a measurement tool downhole can be processed as the measurement tool moves in the borehole. Processing of the measurement values can include determining values for formation resistivity and generating geosignals. The geosignals provide an indication that the measurement is moving near a boundary between formation layers. When the presence of the boundary is determined, the measurement values can be transformed to measurement values corresponding to antenna orientations of the measurement tool that reduce or eliminate the horn effect associated with the downhole measurement values. The resistivity can be recalculated for the transformed measurement corresponding to a tilt angle adjusted from that of the measurement based on the geosignal response. For each boundary encountered in the movement of the measurement tool, two or more recalculations can be performed; at least one approaching the boundary and at least one leaving the boundary. The multiple recalculations can be attributed to measurement values being related to different tilt angles of the antennas of the measurement tool on the different sides of the boundary between formation layers of different resistivity for compensation of the horn effect. The selection of the adjusted tilt angle may be an iterative process using the geosignal responses. These processes can be conducted real time to determine the true formation resistivity. In addition, processes to determine the true formation resistivity may include features of different embodiments discussed herein.

In various embodiments, a machine-readable storage device can be structured having instructions stored thereon, which, when performed by a machine, cause the machine to perform operations that include using a processor and processing unit structured to process measurement values acquired from a measurement tool operating downhole to determine a true formation resistivity. The measurement tool has arrangement of transmitter antennas and receiver antennas structured similar to or identical to any of the arrangements of transmitters and receivers discussed herein. The processor and processing unit can be coupled to measurement tool operating in the borehole. The operations performed from executing instructions can include, but are not limited to, determining resistivity from measurement values, generating geosignals, determining adjustment tilt angles for the measurement tool, transforming the measurement values to new measurement values based on the adjusted tilt angles, determining the presence of nearby boundaries operations, determining whether a resistivity is a true formation resistivity, and conducting procedures to determine an estimate of the true formation resistivity. The instructions can be executed to perform operations in a manner identical to or similar to processes discussed in herein. The instructions can be executed in conjunction with a control unit to control the firing of selected transmitters and/or receivers and collection of signals at selected receivers and/or transmitters (in view of reciprocity) in a manner similar to or identical to operations associated with methods discussed herein. Further, a machine-readable storage device, herein, is a physical device that stores data represented by physical structure within the device. Examples of machine-readable storage devices include, but are not limited to, read only memory (ROM), random access memory (RAM), magnetic disk storage device, optical storage device, flash memory, and other electronic, magnetic, and/or optical memory devices.

In various embodiments, a system comprises a measurement tool having one or more transmitters and one or more receivers in an antenna arrangement; a control unit operable to generate signals and collect signals in the antenna arrangement; and a processing unit to control and process measurement values from operating the measurement tool. The measurement tool, the control unit, and the processing unit are configured to operate to perform features of methods similar to or identical to features associated with methods discussed herein. The one or more transmitters and the one or more receivers can be realized as transceivers. The control unit is operable to manage selective generation of signals from transceivers and to manage selective collection of received signals at transceivers. The control unit and the processing unit can be structured as separate units or as an integrated unit. The control unit and the processing unit can be separate or integrated with the measurement tool.

Figure 24:
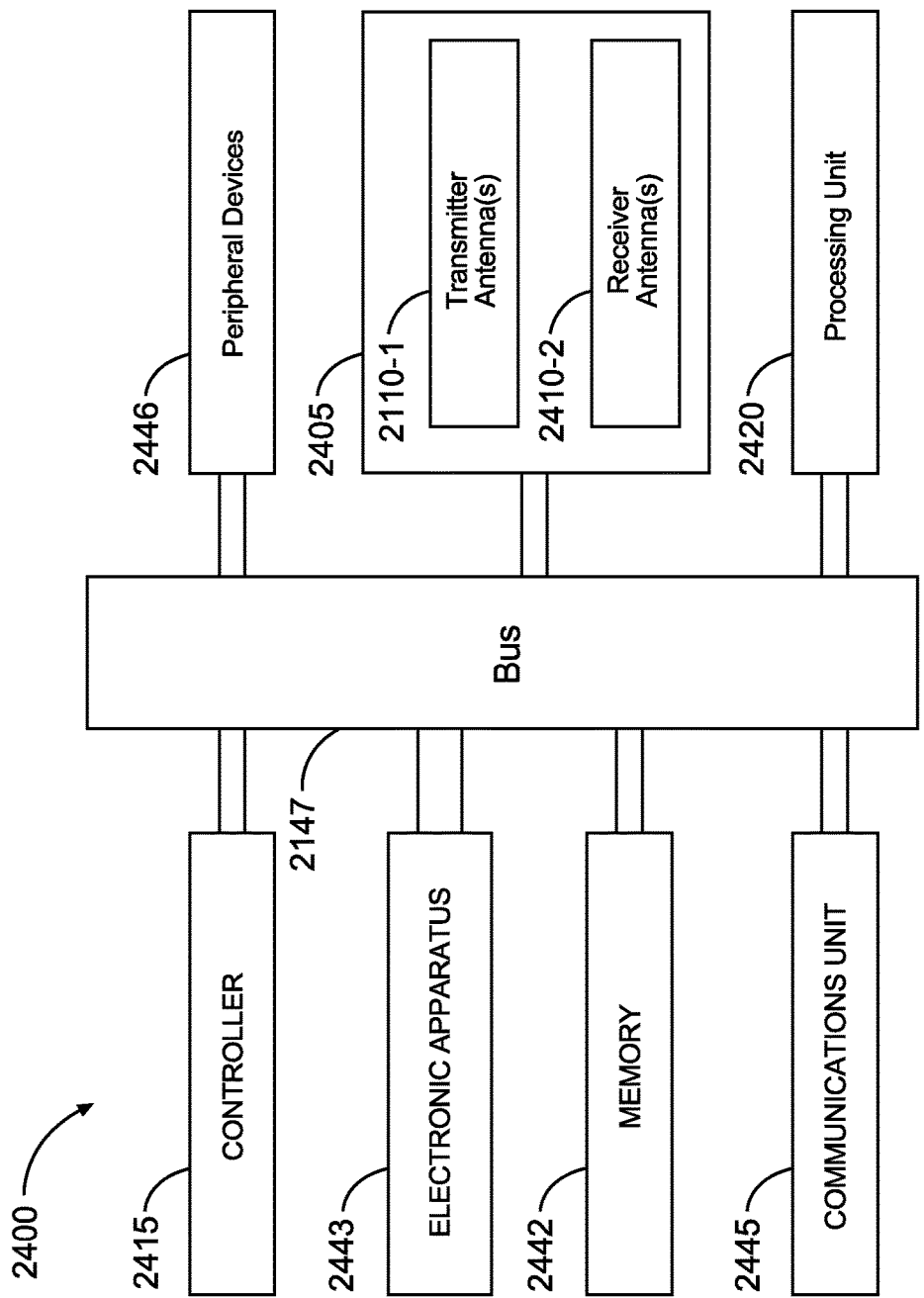
FIG. 24 depicts a block diagram of features of an example system operable to determine true formation resistivity, in accordance with various embodiments.

FIG. 24 depicts a block diagram of features of an example system operable to determine true formation resistivity. System 2400 includes a tool 2405 having an arrangement of transmitters 2410-1 and receivers 2410-2 operable in a borehole. The arrangements of the transmitters 2410-1 and the receivers 2410-2 of the tool 2405 can be realized similar to or identical to arrangements discussed herein. The system 2400 can also include a controller 2415, a memory 2442, an electronic apparatus 2443, and a communications unit 2445. The controller 2415 and the memory 2442 can be arranged to operate the tool 2405 to acquire measurement data as the tool 2405 is operated and to assign the acquired data to a number of bins, each correlated to an azimuthal angle in a rotation of the tool 2405. The controller 2415 and the memory 2442 can be realized to control activation of selected ones of the transmitter antennas 2410-1 and data acquisition by selected one of the receiver antennas 2410-2 in the tool 2405 and to manage processing schemes to determine a true formation resistivity in accordance with measurement procedures and signal processing as described herein. Processing unit 2420 can be structured to perform the operations to manage processing schemes to determine a true formation resistivity in accordance with measurement procedures and signal processing in a manner similar to or identical to embodiments described herein.

Electronic apparatus 2443 can be used in conjunction with the controller 2415 to perform tasks associated with taking measurements downhole with the transmitters 2410-1 and the receivers 2410-2 of the tool 2405. Communications unit 2445 can include downhole communications in a drilling operation. Such downhole communications can include a telemetry system.

The system 2400 can also include a bus 2447, where the bus 2447 provides electrical conductivity among the components of the system 2400. The bus 2447 can include an address bus, a data bus, and a control bus, each independently configured. The bus 2447 can also use common conductive lines for providing one or more of address, data, or control, the use of which can be regulated by the controller 2441. The bus 2447 can be configured such that the components of the system 2400 are distributed. Such distribution can be arranged between downhole components such as the transmitters 2410-1 and the receivers 2410-2 of the tool 2405 and components that can be disposed on the surface of a well. Alternatively, the components can be co-located such as on one or more collars of a drill string or on a wireline structure.

In various embodiments, peripheral devices 2446 can include displays, additional storage memory, and/or other control devices that may operate in conjunction with the controller 2441 and/or the memory 2442. In an embodiment, the controller 2415 can be realized as one or more processors. The peripheral devices 2446 can be arranged with a display with instructions stored in the memory 2442 to implement a user interface to manage the operation of the tool 2405 and/or components distributed within the system 2400. Such a user interface can be operated in conjunction with the communications unit 2445 and the bus 2447. Various components of the system 2400 can be integrated with the tool 2405 such that processing identical to or similar to the processing schemes discussed with respect to various embodiments herein can be performed downhole in the vicinity of the measurement or at the surface.

Figure 25:
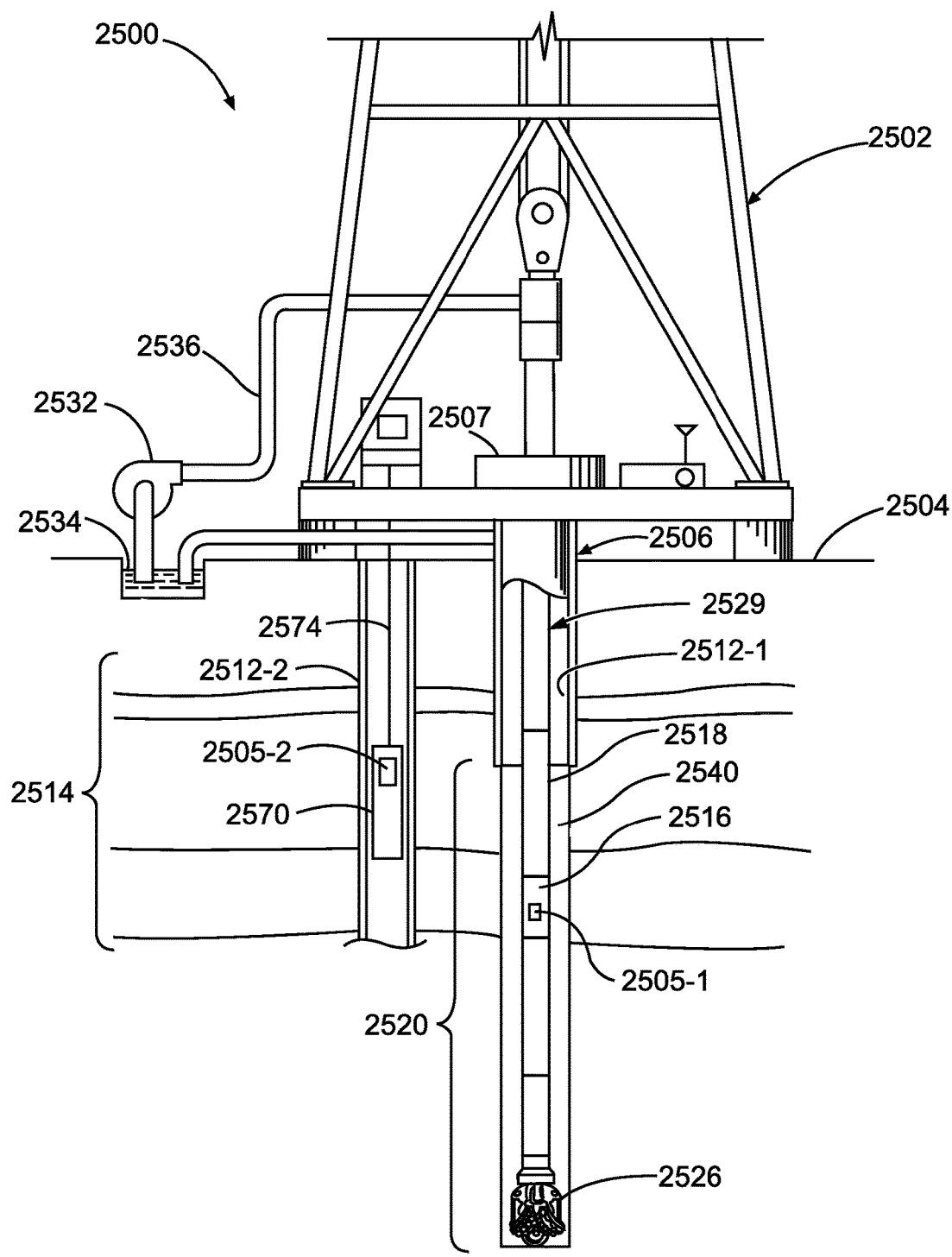
FIG. 25 depicts an embodiment of a system at a drilling site, where the system includes an apparatus operable to determine true formation resistivity, in accordance with various embodiments.

FIG. 25 depicts an embodiment of a system 2500 at a drilling site, where the system 2500 includes an apparatus operable to determine true formation resistivity. The system 2500 can include a tool 2505-1, 2505-2, or both 2505-1 and 2505-2 having an arrangement of transmitter antennas and receiver antennas operable to make measurements that can be used for a number of drilling tasks including, but not limited to, determining resistivity of a formation. The tools 2505-1 and 2505-2 can be structured identical to or similar to a tool architecture or combinations of tool architectures discussed herein, including control units and processing units operable to perform processing schemes in a manner identical to or similar to processing techniques discussed herein. The tools 2505-1, 2505-2, or both 2505-1 and 2505-2 can be distributed among the components of system 2500. The tools 2505-1 and 2505-2 can be realized in a similar or identical manner to arrangements of control units, transmitters, receivers, and processing units discussed herein. The tools 2505-1 and 2505-2 can be structured, fabricated, and calibrated in accordance with various embodiments as taught herein.

The system 2500 can include a drilling rig 2502 located at a surface 2504 of a well 2506 and a string of drill pipes, that is, drill string 2529, connected together so as to form a drilling string that is lowered through a rotary table 2507 into a wellbore or borehole 2512-1. The drilling rig 2502 can provide support for the drill string 2529. The drill string 2529 can operate to penetrate rotary table 2507 for drilling the borehole 2512-1 through subsurface formations 2514. The drill string 2529 can include a drill pipe 2518 and a bottom hole assembly 2520 located at the lower portion of the drill pipe 2518.

The bottom hole assembly 2520 can include a drill collar 2516 and a drill bit 2526. The drill bit 2526 can operate to create the borehole 2512-1 by penetrating the surface 2504 and the subsurface formations 2514. The bottom hole assembly 2520 can include the tool 2505-1 attached to the drill collar 2516 to conduct measurements to determine formation parameters. The tool 2505-1 can be structured for an implementation as a MWD system such as a LWD system. The housing containing the tool 2505-1 can include electronics to initiate measurements from selected transmitter antennas and to collect measurement signals from selected receiver antennas. Such electronics can include a processing unit to provide analysis of formation parameters over a standard communication mechanism for operating in a well. The analysis may include an analysis of an estimate of the true formation resistivity for each formation layer investigated. Alternatively, electronics can include a communications interface to provide measurement signals collected by the tool 2505-1 to the surface over a standard communication mechanism for operating in a well, where these measurements signals can be analyzed at a processing unit at the surface to provide analysis of formation parameters, including an estimate of the true formation resistivity for each formation layer investigated.

During drilling operations, the drill string 2529 can be rotated by the rotary table 2507. In addition to, or alternatively, the bottom hole assembly 2520 can also be rotated by a motor (e.g., a mud motor) that is located downhole. The drill collars 2516 can be used to add weight to the drill bit 2526. The drill collars 2516 also can stiffen the bottom hole assembly 2520 to allow the bottom hole assembly 2520 to transfer the added weight to the drill bit 2526, and in turn, assist the drill bit 2526 in penetrating the surface 2504 and the subsurface formations 2514.

During drilling operations, a mud pump 2532 can pump drilling fluid (sometimes known by those of skill in the art as "drilling mud") from a mud pit 2534 through a hose 2536 into the drill pipe 2518 and down to the drill bit 2526. The drilling fluid can flow out from the drill bit 2526 and be returned to the surface 2504 through an annular area 2540 between the drill pipe 2518 and the sides of the borehole 2512-1. The drilling fluid may then be returned to the mud pit 2534, where such fluid is filtered. In some embodiments, the drilling fluid can be used to cool the drill bit 2526, as well as to provide lubrication for the drill bit 2526 during drilling operations. Additionally, the drilling fluid may be used to remove subsurface formation cuttings created by operating the drill bit 2526.

In various embodiments, the tool 2505-2 may be included in a tool body 2570 coupled to a logging cable 2574 such as, for example, for wireline applications. The tool body 2570 containing the tool 2505-2 can include electronics to initiate measurements from selected transmitter antennas and to collect measurement signals from selected receiver antennas. Such electronics can include a processing unit to provide analysis of formation parameters over a standard communication mechanism for operating in a well. The analysis may include an analysis of an estimate of the true formation resistivity for each formation layer investigated. Alternatively, electronics can include a communications interface to provide measurement signals collected by the tool 2505-2 to the surface over a standard communication mechanism for operating in a well, where these measurements signals can be analyzed at a processing unit at the surface to provide analysis of formation parameters, including an estimate of the true formation resistivity for each formation layer investigated. The logging cable 2574 may be realized as a wireline (multiple power and communication lines), a mono-cable (a single conductor), and/or a slick-line (no conductors for power or communications), or other appropriate structure for use in the borehole 2512. Though FIG. 25 depicts both an arrangement for wireline applications and an arrangement for LWD applications, the system 2500 may be also realized for one of the two applications.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method for reducing a horn effect to more accurately determine a true formation resistivity using an electromagnetic tool, the method comprising:
    lowering the electromagnetic tool into a wellbore, wherein the electromagnetic tool comprises
        a transmitter attached to the electromagnetic tool, wherein the transmitter comprises a transmitter antenna,
        a first receiver attached to the electromagnetic tool, wherein the first receiver comprises a receiver antenna at a first tilt angle with respect to a longitudinal axis of the electromagnetic tool, and wherein the first receiver and the transmitter are axially separated;
    generating a signal with the transmitter;
    measuring voltage values from the first receiver based on a measurement by the first receiver of the signal, wherein measuring voltage values comprises making measurements during a rotation of the electromagnetic tool, the rotation of the electromagnetic tool partitioned into a number of bins, in which completion of the number of bins is one complete rotation of the electromagnetic tool, wherein the number of bins is greater than one;
    determining virtual voltage values at a second tilt angle based on the voltage values, the number of bins, a first ratio, and a second ratio, wherein the first ratio is based on the first tilt angle and the second tilt angle, and wherein the second ratio is based on the number of bins and a difference between the first tilt angle and the second tilt angle; and
    determining an estimate of the true formation resistivity based on the virtual measurement voltage values.

2. The method of claim 1, wherein determining virtual voltage values at the second tilt angle comprises determining $V_{R_{ind}}^{T_{ind}'}(i)$ according to $$V_{R_{ind}}^{T_{ind}'}(i) = V_{R_{ind}}^{T_{ind}}(i) \times \frac{\sin\theta_{r2}}{\sin\theta_{r1}} + \frac{2}{N}\sum_{i=1}^{N} V_{R_{ind}}^{T_{ind}}(i) \times \frac{\sin(\theta_{r1} - \theta_{r2})}{\sin(2\theta_{r1})},$$

$$i = 1, 2, \ldots, N$$

where $T_{ind}$ indicates an index of the transmitter and $R_{ind}$ indicates an index of the first receiver, $V_{R_{ind}}^{T_{ind}}(i)$ is the signal measured at the first receiver, in response to a signal being transmitted from the transmitter having the index $T_{ind}$, in bin i, wherein i is an index value corresponding to one of the number of bins, $\theta_{r1}$ is the first tilt angle, and $V_{R_{ind}}^{T_{ind}'}(i)$ is one of the virtual voltage values at the second tilt angle $\theta_{r2}$.

3. The method of claim 1, wherein the transmitter is non-tilted.

4. The method of claim 1, wherein the transmitter is perpendicular to the first receiver.

5. The method of claim 1, wherein determining virtual voltage values at the second tilt angle comprises determining coupling components, wherein each of the coupling components is one of a set of tensor components of the measurement by the first receiver of the signal in an orthogonal basis shared by the coupling components.

6. The method of claim 1, wherein the electromagnetic tool further comprises a second receiver, and wherein the transmitter is equidistant from the first receiver and the second receiver.

7. The method of claim 1, wherein the method includes using the estimate of the true formation resistivity as an initial guess in a one-dimensional or multi-dimensional inversion procedure.

8. The method of claim 1, further comprising geosteering a drill bit towards a drilling direction based on the virtual voltage values.

9. A method for reducing a horn effect to more accurately determine a true formation resistivity using an electromagnetic tool, the method comprising:
    lowering the electromagnetic tool into a wellbore, wherein the electromagnetic tool comprises
        a transmitter attached to the electromagnetic tool, wherein the transmitter comprises a transmitter antenna,
        a first receiver attached to the electromagnetic tool, wherein the first receiver comprises a receiver antenna at a first tilt angle with respect to a longitudinal axis the of electromagnetic tool, and wherein the first receiver and the transmitter are axially separated;
    generating a signal with the transmitter;
    measuring voltage values from the first receiver based on a measurement by the first receiver of the signal, wherein measuring voltage values from the first receiver comprises making measurements during a rotation of the electromagnetic tool, the rotation of the electromagnetic tool partitioned into a number of bins, in which completion of the number of bins is one complete rotation of the electromagnetic tool, wherein the number of bins is greater than one;

determining an average phase resistivity measurement based on the voltage values;

determining whether the average phase resistivity measurement corresponds to the true formation resistivity;

based on the average phase resistivity measurement not corresponding to the true formation resistivity, determining a reevaluated average phase resistivity based on virtual voltage values, wherein the virtual voltage values are determined at a second tilt angle based on the voltage values, the number of bins, a first ratio, and a second ratio, wherein the first ratio is based on the first tilt angle, and wherein the second ratio is based on the number of bins and a difference between the first tilt angle and the second tilt angle; and determining the true formation resistivity based on the reevaluated average phase resistivity.

10. The method of claim 9, wherein determining whether the average phase resistivity measurement corresponds to the true formation resistivity comprises determining whether the electromagnetic tool is near a boundary when measuring the voltage values.

11. The method of claim 10, further comprising:
determining geosignals based on the voltage values; and
determining whether the electromagnetic tool is near the boundary when measuring the voltage values.

12. The method of claim 9, wherein determining the reevaluated average phase resistivity comprises determining second virtual measured values based on the voltage values, the first tilt angle, and a third tilt angle.

13. The method of claim 9, wherein determining the virtual voltage values is further based on coupling components, wherein each of the coupling components is one of a set of tensor components of the measurement by the first receiver of the signal in an orthogonal basis shared by the coupling components.

14. The method of claim 9, wherein the electromagnetic tool further comprises a second receiver having a second receiver tilt angle, wherein the difference between the second receiver tilt angle and the first tilt angle is greater by at least 20 degrees.

15. The method of claim 9, further comprising geosteering a drill bit towards a drilling direction based on the reevaluated average phase resistivity.

16. A method for reducing a horn effect to more accurately determine a true formation resistivity using an electromagnetic tool, the method comprising:
lowering the electromagnetic tool into a wellbore, wherein the electromagnetic tool comprises
a transmitter attached to the electromagnetic tool, wherein the transmitter comprises a transmitter antenna,
a first receiver attached to the electromagnetic tool, wherein the first receiver comprises a receiver antenna at a first tilt angle with respect to a longitudinal axis of the electromagnetic tool, and wherein the first receiver and the transmitter are axially separated;
generating a signal with the transmitter;
measuring voltage values from the first receiver based on a measurement by the first receiver of the signal, wherein measuring voltage values comprises making measurements during a rotation of the electromagnetic tool, the rotation of the electromagnetic tool partitioned into a number of bins, in which completion of the number of bins is one complete rotation of the electromagnetic tool, wherein the number of bins is greater than one;

determining an average phase resistivity measurement based on the voltage values;

determining whether the average phase resistivity measurement corresponds to the true formation resistivity;

based on the average phase resistivity measurement not corresponding to the true formation resistivity, physically adjusting at least one of a tilt angle of the transmitter or the first tilt angle;

measuring new voltage values from the first receiver;
determining a reevaluated average phase resistivity based on the new voltage values; and determining the true formation resistivity based on the reevaluated average phase resistivity.

17. The method of claim 16, further comprising geosteering a drill bit towards a drilling direction based on the new voltage values.

18. A method for reducing a horn effect to more accurately determine a true formation resistivity of a using an electromagnetic tool, the method comprising:
lowering the electromagnetic tool into a wellbore, wherein the electromagnetic tool comprises
a transmitter attached to the electromagnetic tool, wherein the transmitter comprises a transmitter antenna,
a first receiver attached to the electromagnetic tool, wherein the first receiver comprises a receiver antenna at a first tilt angle with respect to a longitudinal axis of the electromagnetic tool, and wherein the first receiver and the transmitter are axially separated;
generating a signal with the transmitter;
measuring voltage values from the first receiver based on a measurement by the first receiver of the signal, wherein measuring voltage values from the first receiver comprises making measurements during a rotation of the electromagnetic tool, the rotation of the electromagnetic tool partitioned into a number of bins, in which completion of the number of bins is one complete rotation of the electromagnetic tool, wherein the number of bins is greater than one;

determining an average phase resistivity from the voltage values;

determining whether the electromagnetic tool is near a boundary based on geosignal responses;

based on the electromagnetic tool being near the boundary, physically adjusting at least one of a tilt angle of the transmitter or the first tilt angle;

determining new voltage values from the first receiver;
determining a new average phase resistivity measurement based on the new voltage values; and determining the true formation resistivity based on the new average phase resistivity measurement.

19. The method of claim 18, further comprising a second receiver, wherein the second receiver has the first tilt angle, and wherein the transmitter is non-tilted.

20. The method of claim 18, further comprising a second receiver, wherein the second receiver has the first tilt angle, and wherein the transmitter is perpendicular to the first receiver and the second receiver.

21. The method of claim 18, further comprising geosteering a drill bit towards a drilling direction based on the new voltage values.

22. A method for reducing a horn effect to more accurately determine a true formation resistivity using an electromagnetic tool, the method comprising:
- lowering the electromagnetic tool into a wellbore, wherein the electromagnetic tool comprises
  - a transmitter attached to the electromagnetic tool, wherein the transmitter comprises a transmitter antenna,
  - a first receiver attached to the electromagnetic tool, wherein the first receiver comprises a receiver antenna at a first tilt angle with respect to a longitudinal axis of the electromagnetic tool, and wherein the first receiver and the transmitter are axially separated;
- generating a signal with the transmitter;
- measuring voltage values from the first receiver based on a measurement by the first receiver of the signal, wherein measuring voltage values comprises making measurements during a rotation of the electromagnetic tool, the rotation of the electromagnetic tool partitioned into a number of bins, in which completion of the number of bins is one complete rotation of the electromagnetic tool, wherein the number of bins is greater than one;
- determining average phase resistivity measurements based on the voltage values, wherein each of the voltage values are based on one of a plurality of antenna pairs, wherein the each of the plurality of antenna pairs comprises the transmitter and one of the first receiver or a second receiver in the electromagnetic tool;
- determining whether the average phase resistivity measurements correspond to the true formation resistivity based on a comparison of the average phase resistivity measurements;
- based on the average phase resistivity measurements not estimating the true formation resistivity, using geosignal responses to indicate whether the electromagnetic tool is near a boundary;
- based on the geosignal responses indicating that the electromagnetic tool is near the boundary, determining virtual voltage values at a second tilt angle using one or more processors based on the voltage values, the number of bins, a first ratio, and a second ratio, wherein the first ratio is based on the first tilt angle and the second tilt angle, and wherein the second ratio is based on the number of bins and a difference between the first tilt angle and the second tilt angle; and
- determining an estimate of the true formation resistivity based on the virtual voltage values using the one or more processors.

23. The method of claim 22, wherein the comparison of the average phase resistivity measurements comprises determining if magnitudes of respective differences between the average phase resistivity measurements are greater than a threshold.

24. The method of claim 22, further comprising using the estimate of the true formation resistivity as an initial guess in a one-dimensional or multi-dimensional inversion procedure.

25. The method of claim 22, wherein the second receiver has a second receiver tilt angle, wherein the difference between the second receiver tilt angle and the first tilt angle is greater by at least 20 degrees.

26. The method of claim 22, further comprising geosteering a drill bit towards a drilling direction based on the virtual voltage values.

27. A non-transitory machine-readable storage medium storing program code to:
- lowering an electromagnetic tool into a wellbore, wherein the electromagnetic tool comprises
  - a transmitter attached to the electromagnetic tool, wherein the transmitter comprises a transmitter antenna,
  - a first receiver attached to the electromagnetic tool, wherein the first receiver comprises a receiver antenna at a first tilt angle with respect to a longitudinal axis of the electromagnetic tool, and wherein the first receiver and the transmitter are axially separated;
- generate a signal with the transmitter;
- measure voltage values from the first receiver based on a measurement by the first receiver of the signal, wherein measuring voltage values comprises making measurements during a rotation of the electromagnetic tool, the rotation of the electromagnetic tool partitioned into a number of bins, in which completion of the number of bins is one complete rotation of the electromagnetic tool, wherein the number of bins is greater than one;
- determine virtual voltage values at a second tilt angle using one or more processors based on the voltage values, the number of bins, a first ratio, and a second ratio, wherein the first ratio is based on the first tilt angle and the second tilt angle, and wherein the second ratio is based on the number of bins and a difference between the first tilt angle and the second tilt angle; and
- determine an estimate of a true formation resistivity based on the virtual voltage values using the one or more processors.

28. The non-transitory machine-readable storage medium of claim 27, wherein the program code to determine virtual voltage values at the second tilt angle comprises program code to determine $V_{R_{ind}}^{T_{ind}'}(i)$ according to $$V_{R_{ind}}^{T_{ind}'}(i) = V_{R_{ind}}^{T_{ind}}(i) \times \frac{\sin\theta_{r2}}{\sin\theta_{r1}} + \frac{2}{N}\sum_{i=1}^{N} V_{R_{ind}}^{T_{ind}}(i) \times \frac{\sin(\theta_{r1}-\theta_{r2})}{\sin(2\theta_{r1})},$$

$$i = 1, 2, \ldots, N$$

where $T_{ind}$ indicates an index of the transmitter and $R_{ind}$ indicates an index of the first receiver, $V_{R_{ind}}^{T_{ind}}(i)$ is the signal measured at receiver $R_{ind}$, in response to the signal being transmitted from the transmitter having the index $T_{ind}$, in bin i, wherein i is an index value corresponding to one of the number of bins, $\theta_{r1}$ is the first tilt angle, and $V_{R_{ind}}^{T_{ind}'}(i)$ is one of the virtual voltage values at the second tilt angle $\theta_{r2}$.

29. The non-transitory machine-readable storage medium of claim 27, wherein the transmitter is non-tilted.

30. The non-transitory machine-readable storage medium of claim 27, wherein the transmitter is perpendicular to the first receiver.

31. The non-transitory machine-readable storage medium of claim 30, wherein the program code to determine new voltage values comprises program code to determining coupling components, wherein each of the coupling components is one of a set of tensor components of the measurement by the first receiver of the signal in an orthogonal basis shared by the coupling components.

32. The non-transitory machine-readable storage medium of claim 27, wherein the electromagnetic tool further comprises a second receiver, and wherein the transmitter is equidistant from the first receiver and the second receiver.

33. The non-transitory machine-readable storage medium of claim 27, further comprising program code to geosteer a drill bit towards a drilling direction based on the virtual voltage values.

34. A system to determine a true formation resistivity using an electromagnetic tool, the system comprising:
the electromagnetic tool, wherein the electromagnetic tool comprises
a transmitter attached to the electromagnetic tool, wherein the transmitter comprises a transmitter antenna, and
a first receiver attached to the electromagnetic tool, wherein the first receiver comprises a receiver antenna at a first tilt angle with respect to a longitudinal axis of the electromagnetic tool, and wherein the first receiver and the transmitter are axially separated;
one or more processors; and
a non-transitory machine-readable storage medium having program code executable by the one or more processors to:
generate a signal with the transmitter;
measure voltage values from the first receiver based on a measurement by the first receiver of the signal, wherein measuring voltage values comprises making measurements during a rotation of the electromagnetic tool, the rotation of the electromagnetic tool partitioned into a number of bins, in which completion of the number of bins is one complete rotation of the electromagnetic tool, wherein the number of bins is greater than one;
determine virtual voltage values at a second tilt angle based on the voltage values, the number of bins, a first ratio, and a second ratio, wherein the first ratio is based on the first tilt angle and the second tilt angle, and wherein the second ratio is based on the number of bins and a difference between the first tilt angle and the second tilt angle; and
determine an estimate of the true formation resistivity based on the virtual voltage values.

35. The system of claim 34, wherein the program code executable by the one or more processors to determine virtual voltage values at the second tilt angle comprises program code to determine $V_{R_{ind}}^{T_{ind}}(i)$ according to $$V_{R_{ind}}^{T_{ind}\prime}(i) = V_{R_{ind}}^{T_{ind}}(i) \times \frac{\sin\theta_{r2}}{\sin\theta_{r1}} + \frac{2}{N}\sum_{i=1}^{N} V_{R_{ind}}^{T_{ind}}(i) \times \frac{\sin(\theta_{r1} - \theta_{r2})}{\sin(2\theta_{r1})},$$

$$i = 1, 2, \ldots, N$$

where $T_{ind}$ indicates an index of the transmitter and $R_{ind}$ indicates an index of the first receiver, $V_{R_{ind}}^{T_{ind}}(i)$ is the signal measured at the first receiver, in response to the signal being transmitted from the transmitter having the index $T_{ind}$, in bin i, wherein i is an index value corresponding to one of the number of bins, $\theta_{r1}$ is the first tilt angle, and $V_{R_{ind}}^{T_{ind}\prime}(i)$ is one of the new virtual voltage values at the second tilt angle $\theta_{r2}$.

36. The system of claim 35, wherein the transmitter is non-tilted.

37. The system of claim 35, wherein the transmitter is perpendicular to the first receiver.

38. The system of claim 37, wherein the program code executable by the one or more processors generates new voltage values comprises program code to determine coupling components, wherein each of the coupling components is one of a set of tensor components of the measurement by the first receiver of the signal in an orthogonal basis shared by the coupling components.

39. The system of claim 34, wherein the electromagnetic tool further comprises a second receiver, and wherein the transmitter is equidistant from the first receiver and the second receiver.

40. The system of claim 34, wherein the electromagnetic tool further comprises a second receiver having a second receiver tilt angle, wherein the difference between the second receiver tilt angle and the first tilt angle is greater by at least 20 degrees.

41. The system of claim 34, further comprising program code to geosteer a drill bit towards a drilling direction based on the virtual voltage values.

42. A system to determine a true formation resistivity using an electromagnetic tool, the system comprising:
the electromagnetic tool, wherein the electromagnetic tool comprises
a transmitter attached to the electromagnetic tool, wherein the transmitter comprises a transmitter antenna, and
a first receiver attached to the electromagnetic tool, wherein the first receiver comprises a receiver antenna at has a first tilt angle with respect to a longitudinal axis of the electromagnetic tool, and wherein the first receiver and the transmitter are axially separated;
one or more processors; and
a non-transitory machine-readable storage medium having program code executable by the one or more processors to:
generate a signal with the transmitter;
measure voltage values from the first receiver based on a measurement by the first receiver of the signal, wherein measuring voltage values comprises making measurements during a rotation of the electromagnetic tool, the rotation of the electromagnetic tool partitioned into a number of bins, in which completion of the number of bins is one complete rotation of the electromagnetic tool, wherein the number of bins is greater than one;
determine an average phase resistivity measurement based on the voltage values;
determine whether the average phase resistivity measurement corresponds to the true formation resistivity; and
based on the average phase resistivity measurement not corresponding to the true formation resistivity, determine a reevaluated average phase resistivity based on virtual voltage values using the one or more processors, wherein the virtual voltage values are determined at a second tilt angle using the one or more processors based on the voltage values, the number of bins, a first ratio, and a second ratio, wherein the first ratio is based on the first tilt angle and the second tilt angle, and wherein the second ratio is based on the number of bins and a difference between the first tilt angle and the second tilt angle; and
determine the true formation resistivity based on the reevaluated average phase resistivity.

43. The system of claim 42, wherein the program code executable by the one or more processors determines whether the average phase resistivity measurement corresponds to the true formation resistivity comprises program code to determine whether the electromagnetic tool is near a boundary when measuring the voltage values.

44. The system of claim 42, wherein the program code executable by the one or more processors determines second virtual voltage values based on the voltage values, the first tilt angle, and a third tilt angle, wherein the first receiver has the first tilt angle.

45. The system of claim 42, wherein the program code executable by the one or more processors determines the virtual voltage values is based on coupling components, wherein each of the coupling components is one of a set of tensor components of the measurement by the first receiver of the signal in an orthogonal basis shared by the coupling components.

46. The system of claim 42, wherein the electromagnetic tool further comprises a second receiver having a second receiver tilt angle, wherein the difference between the second receiver tilt angle and the first tilt angle is greater by at least 20 degrees.

47. The system of claim 42, further comprising program code executable by the one or more processors to geosteer a drill bit towards a drilling direction based on the reevaluated average phase resistivity.

48. A system to determine a true formation resistivity using an electromagnetic tool, the system comprising:
the electromagnetic tool, wherein the electromagnetic tool comprises
a transmitter attached to the electromagnetic tool, wherein the transmitter comprises a transmitter antenna, and
a first receiver attached to the electromagnetic tool, wherein the first receiver comprises a receiver antenna at a first tilt angle with respect to a longitudinal axis of the electromagnetic tool, and wherein the first receiver and the transmitter are axially separated;
one or more processors; and
a non-transitory machine-readable medium having program code executable by the one or more processors to:
generate a signal with the transmitter;
measure voltage values from the first receiver based on a measurement by the first receiver of the signal, wherein measuring voltage values comprises making measurements during a rotation of the electromagnetic tool, the rotation of the electromagnetic tool partitioned into a number of bins, in which completion of the number of bins is one complete rotation of the electromagnetic tool, wherein the number of bins is greater than one;
determine an average phase resistivity measurement based on the voltage values;
determine whether the average phase resistivity measurement corresponds to the true formation resistivity;
based on the average phase resistivity measurement not corresponding to the true formation resistivity, physically adjust at least one of a tilt angle of the transmitter and the first receiver tilt angle;
measure new voltage values from the first receiver;
determine a reevaluated average phase resistivity based on the new voltage values; and
determine the true formation resistivity based on the reevaluated average phase resistivity.

49. The system of claim 48, further comprising program code executable by the one or more processors to geosteer a drill bit towards a drilling direction based on the new voltage values.

50. A system to determine a true formation resistivity using an electromagnetic tool, the system comprising:
the electromagnetic tool, wherein the electromagnetic tool comprises
a transmitter attached to the electromagnetic tool, wherein the transmitter comprises a transmitter antenna, and
a first receiver attached to the electromagnetic tool, wherein the first receiver comprises a receiver antenna at a first tilt angle with respect to a longitudinal axis of the electromagnetic tool, and wherein the first receiver and the transmitter are axially separated;
one or more processors; and
a machine-readable medium having program code executable by the one or more processors to:
generate a signal with the transmitter;
measure voltage values from the first receiver based on a measurement by the first receiver of the signal, wherein measuring voltage values comprises making measurements during a rotation of the electromagnetic tool, the rotation of the electromagnetic tool partitioned into a number of bins, in which completion of the number of bins is one complete rotation of the electromagnetic tool, wherein the number of bins is greater than one;
determine an average phase resistivity from the voltage values;
determine whether the electromagnetic tool is near a boundary based on geosignal responses;
based on the electromagnetic tool being near the boundary, physically adjust at least one of a tilt angle of the transmitter or the first tilt angle, and
determine a new average phase resistivity based on new voltage values from the first receiver; and
determine the true formation resistivity based on the new average phase resistivity.

51. The system of claim 50, further comprising a second receiver, wherein the second receiver has the first tilt angle, and wherein the transmitter is non-tilted.

52. The system of claim 50, further comprising a second receiver, wherein the second receiver has the first tilt angle, and wherein the transmitter is perpendicular to the first receiver and the second receiver.

53. The system of claim 50, further comprising code executable by the one or more processors to geosteer a drill bit towards a drilling direction based on the new voltage values.

54. A system to determine a true formation resistivity using an electromagnetic tool, the system comprising:
the electromagnetic tool, wherein the electromagnetic tool comprises
a transmitter attached to the electromagnetic tool, wherein the transmitter comprises a transmitter antenna,
a first receiver attached to the electromagnetic tool, wherein the first receiver comprises a first receiver antenna at a first tilt angle with respect to a longitudinal axis of the electromagnetic tool, and wherein the first receiver and the transmitter are axially separated, and
a second receiver attached to the electromagnetic tool, wherein the second receiver comprises a second receiver antenna at an alternate tilt angle with respect to the longitudinal axis of the electromagnetic tool, and wherein the second receiver is axially separated from the transmitter;

one or more processors; and a non-transitory machine-readable medium having program code executable by the one or more processors to:

generate a signal using the transmitter;

measure voltage voltage values from the first receiver based on a measurement by the first receiver of the signal, wherein measuring voltage values comprises making measurements during a rotation of the electromagnetic tool, the rotation of the electromagnetic tool partitioned into a number of bins, in which completion of the number of bins is one complete rotation of the electromagnetic tool, wherein the number of bins is greater than one;

determine average phase resistivity measurements based on the voltage values, wherein each of the voltage values are based on one of a plurality of antenna pairs, wherein the each of the plurality of antenna pairs comprises the transmitter and one of the first receiver or a second receiver in the electromagnetic tool;

determine whether the average phase resistivity measurements correspond to the true formation resistivity based on a comparison of the average phase resistivity measurements; and based on the average phase resistivity measurements not estimating the true formation resistivity, use geosignal responses to indicate whether the electromagnetic tool is near a boundary;

based on the geosignal responses indicating that the electromagnetic tool is near the boundary, determine virtual voltage values at a second tilt angle using the one or more processors based on the voltage values, the number of bins, a first ratio, and a second ratio, wherein the first ratio is based on the second tilt angle and either the first tilt angle or the alternate tilt angle, and wherein the second ratio is based on the number of bins and a difference between the second tilt angle and either the first tilt angle or the alternate tilt angle; and determining an estimate of the true formation resistivity based on the virtual voltage values.

55. The system of claim 54, wherein the comparison of the average phase resistivity measurements comprises determining if magnitudes of respective differences between the average phase resistivity measurements are greater than a threshold.

56. The system of claim 54, wherein the program code executable by the one or more processors to use the estimate of the true formation resistivity as an initial guess in a one-dimensional or multi-dimensional inversion procedure.

57. The system of claim 54, wherein the second receiver has a second receiver tilt angle, wherein the difference between the second receiver tilt angle and the first tilt angle is greater by at least 20 degrees.

58. The system of claim 54, further comprising code executable by the one or more processors to geosteer a drill bit towards a drilling direction based on the virtual voltage values.

59. A non-transitory machine-readable storage medium comprising program code to:

lowering an electromagnetic tool into a wellbore, wherein the electromagnetic tool comprises a transmitter attached to the electromagnetic tool, wherein the transmitter comprises a transmitter antenna, a first receiver attached to the electromagnetic tool, wherein the first receiver comprises a receiver antenna at a first tilt angle with respect to a longitudinal axis of the electromagnetic tool, and wherein the first receiver and the transmitter are axially separated;

generate a signal with the transmitter;

measuring voltage values from the first receiver based on a measurement by the first receiver of the signal, wherein measuring voltage values comprises making measurements during a rotation of the electromagnetic tool, the rotation of the electromagnetic tool partitioned into a number of bins, in which completion of the number of bins is one complete rotation of the electromagnetic tool, wherein the number of bins is greater than one;

determining an average phase resistivity measurement based on from the voltage values;

determining whether the average phase resistivity measurement corresponds to a true formation resistivity; and based on the average phase resistivity measurement not corresponding to the true formation resistivity, determine a reevaluated average phase resistivity based on virtual voltage values, wherein the virtual voltage values are determined at a second tilt angle based on the voltage values, the number of bins, a first ratio, and a second ratio, wherein the first ratio is based on the first tilt angle, and wherein the second ratio is based on the number of bins and a difference between the first tilt angle and the second tilt angle; and determining the true formation resistivity based on the reevaluated average phase resistivity.

60. The non-transitory machine-readable storage medium of claim 59, wherein the program code to determine whether the average phase resistivity measurement corresponds to the true formation resistivity comprises program code to determine whether the electromagnetic tool is near a boundary when measuring the voltage values.

61. The non-transitory machine-readable storage medium of claim 59, wherein the program code to determine the reevaluated average phase resistivity comprises program code to determine second virtual voltage values based on the voltage values, first tilt angle, and a third tilt angle.

62. The non-transitory machine-readable storage medium of claim 59, wherein the program code to determine the virtual voltage values comprises program code to determine virtual voltage values based on coupling components, wherein each of the coupling components is one of a set of tensor components of the measurement by the first receiver of the signal in an orthogonal basis shared by the coupling components.

63. The non-transitory machine-readable storage medium of claim 59, further comprising program code to use the reevaluated average phase resistivity as an initial guess in a one-dimensional or multi-dimensional inversion procedure.

64. The non-transitory machine-readable storage medium of claim 59, wherein the electromagnetic tool further comprises a second receiver having a second receiver tilt angle, wherein the difference between the second receiver tilt angle and the first tilt angle is greater by at least 20 degrees.

65. The non-transitory machine-readable storage medium of claim 59, further comprising code to geosteer a drill bit towards a drilling direction based on the virtual voltage values.

66. A non-transitory machine-readable storage medium storing program code to:

lowering an electromagnetic tool into a wellbore, wherein the electromagnetic tool comprises, a transmitter attached to the electromagnetic tool, wherein the transmitter comprises a transmitter antenna, a first receiver attached to the electromagnetic tool, wherein the first receiver comprises a receiver antenna at a first tilt angle with respect to a longitudinal axis of the electromagnetic tool, and wherein the first receiver and the transmitter are axially separated;

generating a signal with the transmitter;

measuring voltage values from the first receiver based on a measurement by the first receiver of the signal, wherein measuring voltage values comprises making measurements during a rotation of the electromagnetic tool, the rotation of the electromagnetic tool partitioned into a number of bins, in which completion of the number of bins is one complete rotation of the electromagnetic tool, wherein the number of bins is greater than one;

determine an average phase resistivity measurement based on the voltage values;

determine whether the average phase resistivity measurement corresponds to a true formation resistivity;

based on the average phase resistivity measurement not corresponding to the true formation resistivity, physically adjust least one of a tilt angle of the transmitter or the first tilt angle;

measuring new voltage values from the first receiver;

determine a reevaluated average phase resistivity based on the new voltage values; and determining the true formation resistivity based on the reevaluated average phase resistivity.

67. The non-transitory machine-readable storage medium of claim 66, further comprising code to geosteer a drill bit towards a drilling direction based on the new voltage values.

68. A non-transitory machine-readable storage medium storing program code to:

lower an electromagnetic tool into a wellbore, wherein the electromagnetic tool comprises a transmitter attached to the electromagnetic tool, wherein the transmitter comprises a transmitter antenna, a first receiver attached to the electromagnetic tool, wherein the first receiver comprises a receiver antenna at a first tilt angle with respect to a longitudinal axis of the electromagnetic tool, and wherein the first receiver and the transmitter are axially separated;

generate a signal using the transmitter, wherein one or more processors is coupled to the electromagnetic tool;

measure voltage values from the first receiver based on a measurement by the first receiver of the signal, wherein measuring voltage values comprises making measurements during a rotation of the electromagnetic tool, the rotation of the electromagnetic tool partitioned into a number of bins, in which completion of the number of bins is one complete rotation of the electromagnetic tool, wherein the number of bins is greater than one;

determine an average phase resistivity from the voltage values;

determine whether the electromagnetic tool is near a boundary based on geosignal responses;

based on the electromagnetic tool being near the boundary, physically adjust at least one of a tilt angle of the transmitter or the first tilt angle;

determine new voltage values from the first receiver;

determine a new average phase resistivity measurement based on the new voltage values; and determine an estimate of a true formation resistivity based on the new average phase resistivity measurement.

69. The non-transitory machine-readable storage medium of claim 68, wherein the electromagnetic tool further comprises a second receiver, wherein the second receiver has the first tilt angle, and wherein the transmitter is non-tilted.

70. The non-transitory machine-readable storage medium of claim 68, wherein the transmitter is perpendicular to the first receiver.

71. The non-transitory machine-readable storage medium of claim 68, further comprising code to geosteer a drill bit towards a drilling direction based on the new voltage values.

72. A non-transitory machine-readable storage medium storing program code to:

lower an electromagnetic tool into a wellbore, wherein the electromagnetic tool comprises a transmitter attached to the electromagnetic tool, wherein the transmitter comprises a transmitter antenna, a first receiver attached to the electromagnetic tool, wherein the first receiver comprises a receiver antenna at a first tilt angle with respect to a longitudinal axis of the electromagnetic tool, and wherein the first receiver and the transmitter are axially separated;

generate a signal with the transmitter;

measure voltage values from the first receiver based on a measurement by the first receiver of the signal, wherein measuring voltage values comprises making measurements during a rotation of the electromagnetic tool, the rotation of the electromagnetic tool partitioned into a number of bins, in which completion of the number of bins is one complete rotation of the electromagnetic tool, wherein the number of bins is greater than one;

determine average phase resistivity measurements based on the voltage values, wherein each of the voltage values are based on one of a plurality of antenna pairs, wherein the each of the plurality of antenna pairs comprises the transmitter and one of the first receiver or a second receiver in the electromagnetic tool;

determine whether the average phase resistivity measurements corresponds to a true formation resistivity based on a comparison of the average phase resistivity measurements;

based on the average phase resistivity measurements not estimating the true formation resistivity, use geosignal responses to indicate whether the electromagnetic tool is near a boundary;

based on the geosignal responses indicating that the electromagnetic tool is near the boundary, determine virtual voltage values at a second tilt angle using one or more processors, based on the voltage values, the number of bins, a first ratio, and a second ratio, wherein the first ratio is based on the first tilt angle and the second tilt angle, and wherein the second ratio is based on the number of bins and a difference between the first tilt angle and the second tilt angle; and determining an estimate of the true formation resistivity based on the virtual voltage values.

73. The non-transitory machine-readable storage medium of claim 72, wherein the comparison of the average phase resistivity measurements is determined by determining if magnitudes of respective differences between the average phase resistivity measurements are greater than a threshold.

74. The non-transitory machine-readable storage medium of claim 72, further comprising program code to use a value corresponding to the true formation resistivity as an initial guess in a one-dimensional or multi-dimensional inversion procedure such that an inverted geology formation is optimized.

75. The non-transitory machine-readable storage medium of claim 72, further comprising code to geosteer a drill bit towards a drilling direction based on the virtual voltage values.

* * * * *